(12) United States Patent
Chen et al.

(10) Patent No.: US 7,244,407 B2
(45) Date of Patent: *Jul. 17, 2007

(54) POLYMER AND METHOD FOR USING THE POLYMER FOR SOLUBILIZING NANOTUBES

(75) Inventors: Jian Chen, Richardson, TX (US); Haiying Liu, Houghton, MI (US)

(73) Assignees: Zyvex Performance Materials, LLC, Richardson, TX (US); The University of Pittsburgh - of the Commonwealth System of Higher Education, Pittsburgh, PA (US)

( * ) Notice: Subject to any disclaimer, the term of this patent is extended or adjusted under 35 U.S.C. 154(b) by 250 days.

This patent is subject to a terminal disclaimer.

(21) Appl. No.: 10/895,161

(22) Filed: Jul. 20, 2004

(65) Prior Publication Data

US 2004/0266939 A1 Dec. 30, 2004

Related U.S. Application Data

(63) Continuation of application No. 10/255,122, filed on Sep. 24, 2002, now abandoned.

(60) Provisional application No. 60/377,856, filed on May 2, 2002, provisional application No. 60/377,920, filed on May 2, 2002.

(51) Int. Cl.
*C01B 31/02* (2006.01)

(52) U.S. Cl. .............................. 423/445 B; 423/445 R; 423/460; 428/367; 428/398; 428/408; 524/495; 524/496; 525/416

(58) Field of Classification Search ................ 428/367, 428/398, 408; 524/495, 496; 525/416; 423/445 B, 445 R, 460
See application file for complete search history.

(56) References Cited

U.S. PATENT DOCUMENTS

| | | | |
|---|---|---|---|
| 4,663,230 A | 5/1987 | Tennent | |
| 5,098,771 A | 3/1992 | Friend | |
| 5,204,038 A | 4/1993 | Heeger et al. | |
| 5,281,406 A | 1/1994 | Stalling et al. | |
| 5,482,601 A | 1/1996 | Ohshima et al. | |
| 5,560,898 A | 10/1996 | Uchida et al. | |
| 5,578,543 A | 11/1996 | Tennent et al. | |
| 5,611,964 A | 3/1997 | Friend et al. | |
| 5,627,140 A | 5/1997 | Fossheim et al. | |
| 5,753,088 A | 5/1998 | Olk | |
| 5,824,470 A | 10/1998 | Baldeschwieler et al. | |
| 5,866,434 A | 2/1999 | Massey et al. | |
| 5,877,110 A | 3/1999 | Snyder et al. | |
| 5,965,470 A | 10/1999 | Bening et al. | |
| 5,968,650 A | 10/1999 | Tennent et al. | |
| 6,017,390 A | 1/2000 | Charych et al. | |
| 6,066,448 A | 5/2000 | Wohlstadter et al. | |
| 6,113,819 A | 9/2000 | Tennent et al. | |
| 6,140,045 A | 10/2000 | Wohlstadter et al. | |
| 6,146,227 A | 11/2000 | Mancevski | |
| 6,146,230 A | 11/2000 | Kim et al. | |
| 6,180,114 B1 | 1/2001 | Yager et al. | |
| 6,187,823 B1 | 2/2001 | Haddon et al. | |
| 6,203,814 B1 | 3/2001 | Fisher et al. | |
| 6,276,214 B1 | 8/2001 | Kimura et al. | |
| 6,284,832 B1 | 9/2001 | Foulger et al. | |
| 6,299,812 B1 | 10/2001 | Newman et al. | |
| 6,315,956 B1 | 11/2001 | Foulger | |
| 6,331,262 B1 | 12/2001 | Haddon et al. | |
| 6,362,011 B1 | 3/2002 | Massey et al. | |
| 6,368,569 B1 | 4/2002 | Haddon et al. | |
| 6,417,265 B1 | 7/2002 | Foulger | |
| 6,422,450 B1 | 7/2002 | Zhou et al. | |
| 6,426,134 B1 | 7/2002 | Lavin et al. | |
| 6,430,511 B1 | 8/2002 | Tour et al. | |
| 6,432,320 B1 | 8/2002 | Bonsignore et al. | |
| 6,464,908 B1 | 10/2002 | Friend et al. | |
| 6,491,789 B2 | 12/2002 | Niu | |

(Continued)

FOREIGN PATENT DOCUMENTS

DE 31 18 503 A 11/1982

(Continued)

OTHER PUBLICATIONS

Japanese Office Action and translation of same from Japanese Application JP2003-127114, dated Nov. 30, 2004.

(Continued)

*Primary Examiner*—Bernard Lipman
(74) *Attorney, Agent, or Firm*—Haynes and Boone, LLP

(57) ABSTRACT

A new, non-wrapping approach to solubilize nanotubes, such as carbon nanotubes, in organic and inorganic solvents is provided. In accordance with certain embodiments, carbon nanotube surfaces are functionalized in a non-wrapping fashion by functional conjugated polymers that include functional groups for solubilizing such nanotubes. Various embodiments provide polymers that noncovalently bond with carbon nanotubes in a non-wrapping fashion. For example, various embodiments of polymers are provided that comprise a relatively rigid backbone that is suitable for noncovalently bonding with a carbon nanotube substantially along the nanotube's length, as opposed to about its diameter. In preferred polymers, the major interaction between the polymer backbone and the nanotube surface is parallel π-stacking. The polymers further comprise at least one functional extension from the backbone that are any of various desired functional groups that are suitable for solubilizing a carbon nanotube.

78 Claims, 8 Drawing Sheets

U.S. PATENT DOCUMENTS

| | | |
|---|---|---|
| 6,524,466 B1 | 2/2003 | Bonaventura et al. |
| 6,531,513 B2 | 3/2003 | Haddon et al. |
| 6,555,945 B1 | 4/2003 | Baughman et al. |
| 6,569,937 B2 | 5/2003 | Foulger et al. |
| 6,576,341 B1 | 6/2003 | Davey et al. |
| 6,597,090 B1 | 7/2003 | Mancevski |
| 6,599,961 B1 | 7/2003 | Pienkowski et al. |
| 6,610,351 B2 | 8/2003 | Shchegolikhin et al. |
| 6,617,398 B2 | 9/2003 | Yeager et al. |
| 6,630,772 B1 | 10/2003 | Bower et al. |
| 6,634,321 B2 | 10/2003 | Hussain et al. |
| 6,641,793 B2 | 11/2003 | Haddon et al. |
| 6,645,455 B2 | 11/2003 | Margrave et al. |
| 6,656,763 B1 | 12/2003 | Oglesby et al. |
| 6,669,918 B2 | 12/2003 | Schleier-Smith et al. |
| 6,670,179 B1 | 12/2003 | Mattson et al. |
| 6,680,016 B2 | 1/2004 | Wang et al. |
| 6,682,677 B2 | 1/2004 | Lobovsky et al. |
| 6,683,783 B1 | 1/2004 | Smalley et al. |
| 6,685,810 B2 | 2/2004 | Noca et al. |
| 6,693,055 B2 | 2/2004 | Yoon et al. |
| 6,695,974 B2 | 2/2004 | Withers et al. |
| 6,709,566 B2 | 3/2004 | Cumings et al. |
| 6,712,864 B2 | 3/2004 | Horiuchi et al. |
| 6,723,299 B1 | 4/2004 | Chen et al. |
| 6,734,087 B2 | 5/2004 | Hidaka et al. |
| 6,737,939 B2 | 5/2004 | Hoppe et al. |
| 6,741,019 B1 | 5/2004 | Filas et al. |
| 6,746,627 B2 | 6/2004 | Niu et al. |
| 6,746,971 B1 | 6/2004 | Ngo et al. |
| 6,749,712 B2 | 6/2004 | Kuper |
| 6,756,025 B2 | 6/2004 | Colbert et al. |
| 6,756,795 B2 | 6/2004 | Hunt et al. |
| 6,758,891 B2 | 7/2004 | Bergemann et al. |
| 6,762,025 B2 | 7/2004 | Cubicciotti |
| 6,762,237 B2 | 7/2004 | Glatkowski et al. |
| 6,764,540 B2 | 7/2004 | Taguchi |
| 6,770,583 B2 | 8/2004 | Keller |
| 6,770,905 B1 | 8/2004 | Buynoski et al. |
| 6,773,954 B1 | 8/2004 | Subramanian et al. |
| 6,774,333 B2 | 8/2004 | Hannah |
| 6,782,154 B2 | 8/2004 | Zhao et al. |
| 6,783,702 B2 | 8/2004 | Niu et al. |
| 6,783,746 B1 | 8/2004 | Zhang et al. |
| 6,790,425 B1 | 9/2004 | Smalley et al. |
| 6,790,790 B1 | 9/2004 | Lyons et al. |
| 6,798,127 B2 | 9/2004 | Mao et al. |
| 6,803,840 B2 | 10/2004 | Hunt et al. |
| 6,805,642 B2 | 10/2004 | Meyer |
| 6,805,801 B1 | 10/2004 | Humayun et al. |
| 6,806,996 B2 | 10/2004 | Tatsuura et al. |
| 6,818,821 B2 | 11/2004 | Fujieda et al. |
| 6,824,974 B2 | 11/2004 | Pisharody et al. |
| 6,825,060 B1 | 11/2004 | Lyons et al. |
| 6,827,918 B2 | 12/2004 | Margrave et al. |
| 6,835,366 B1 | 12/2004 | Margrave et al. |
| 6,841,139 B2 | 1/2005 | Margrave et al. |
| 6,842,328 B2 | 1/2005 | Schott et al. |
| 6,843,850 B2 | 1/2005 | Avouris et al. |
| 6,852,410 B2 | 2/2005 | Veedu et al. |
| 6,861,481 B2 | 3/2005 | Ding et al. |
| 6,866,891 B2 | 3/2005 | Liebau et al. |
| 6,875,274 B2 | 4/2005 | Wong et al. |
| 6,875,412 B2 | 4/2005 | Margrave et al. |
| 6,878,961 B2 | 4/2005 | Lyons et al. |
| 6,890,654 B2 | 5/2005 | Stupp et al. |
| 6,894,359 B2 | 5/2005 | Bradley et al. |
| 6,896,864 B2 | 5/2005 | Clarke |
| 6,897,009 B2 | 5/2005 | Johnson, Jr. et al. |
| 6,899,945 B2 | 5/2005 | Smalley et al. |
| 6,900,264 B2 | 5/2005 | Kumar et al. |
| 6,902,658 B2 | 6/2005 | Talin et al. |
| 6,902,720 B2 | 6/2005 | McGimpsey |
| 6,905,667 B1 | 6/2005 | Chen et al. |
| 6,908,261 B2 | 6/2005 | Hannay et al. |
| 6,914,372 B1 | 7/2005 | Akiyama et al. |
| 6,921,462 B2 | 7/2005 | Montgomery et al. |
| 6,924,003 B2 | 8/2005 | Zhang |
| 6,934,144 B2 | 8/2005 | Ooma et al. |
| 6,936,322 B2 | 8/2005 | Sakakibara et al. |
| 6,936,653 B2 | 8/2005 | McElrath et al. |
| 6,872,681 B2 | 9/2005 | Niu et al. |
| 6,946,597 B2 | 9/2005 | Sager et al. |
| 6,949,216 B2 | 9/2005 | Brice et al. |
| 6,955,939 B1 | 10/2005 | Lyons et al. |
| 6,958,216 B2 | 10/2005 | Kelley et al. |
| 6,960,425 B2 | 11/2005 | Jung et al. |
| 6,962,092 B2 | 11/2005 | Pasquali et al. |
| 6,969,536 B1 | 11/2005 | Tuck et al. |
| 6,969,690 B2 | 11/2005 | Zhou et al. |
| 6,972,467 B2 | 12/2005 | Zhang et al. |
| 6,974,927 B2 | 12/2005 | Hannah |
| 6,979,248 B2 | 12/2005 | Hu et al. |
| 6,979,709 B2 | 12/2005 | Smalley et al. |
| 6,982,174 B2 | 1/2006 | Bonnell et al. |
| 6,989,325 B2 | 1/2006 | Uang et al. |
| 6,991,528 B2 | 1/2006 | Hu et al. |
| 7,008,563 B2 | 3/2006 | Smalley et al. |
| 7,008,758 B2 | 3/2006 | Park et al. |
| 7,015,393 B2 | 3/2006 | Weiner et al. |
| 7,018,261 B2 | 3/2006 | Perlo et al. |
| 7,025,840 B1 | 4/2006 | Adams |
| 7,026,432 B2 | 4/2006 | Charati et al. |
| 7,029,598 B2 | 4/2006 | Sato |
| 7,029,646 B2 | 4/2006 | Margrave et al. |
| 7,040,948 B2 | 5/2006 | Mao et al. |
| 7,045,087 B2 | 5/2006 | Kotov |
| 7,048,903 B2 | 5/2006 | Colbert et al. |
| 7,048,999 B2 | 5/2006 | Smalley et al. |
| 7,052,668 B2 | 5/2006 | Smalley et al. |
| 7,056,452 B2 | 6/2006 | Niu et al. |
| 7,056,455 B2 | 6/2006 | Matyjaszewski et al. |
| 7,060,241 B2 | 6/2006 | Glatkowski |
| 7,061,749 B2 | 6/2006 | Liu et al. |
| 7,065,857 B2 | 6/2006 | Watanabe et al. |
| 7,066,800 B2 | 6/2006 | Chen et al. |
| 7,067,096 B2 | 6/2006 | Iijima et al. |
| 7,070,753 B2 | 7/2006 | Niu et al. |
| 7,070,810 B2 | 7/2006 | Hirsch et al. |
| 7,070,923 B1 | 7/2006 | Loftus |
| 7,071,287 B2 | 7/2006 | Rhine et al. |
| 7,074,980 B2 | 7/2006 | Prato et al. |
| 7,075,067 B2 | 7/2006 | Joyce et al. |
| 7,081,429 B2 | 7/2006 | Kishi et al. |
| 7,087,290 B2 | 8/2006 | Feist et al. |
| 7,093,664 B2 | 8/2006 | Todd et al. |
| 7,094,367 B1 | 8/2006 | Harmon et al. |
| 7,094,467 B2 | 8/2006 | Zhang et al. |
| 7,105,596 B2 | 9/2006 | Smalley et al. |
| 7,112,816 B2 | 9/2006 | Schlaf et al. |
| 7,115,305 B2 | 10/2006 | Bronikowski et al. |
| 7,116,273 B2 | 10/2006 | Morikawa et al. |
| 7,118,881 B2 | 10/2006 | Lee et al. |
| 7,122,165 B2 | 10/2006 | Wong et al. |
| 7,122,461 B2 | 10/2006 | Dubin |
| 7,125,533 B2 | 10/2006 | Khabashesku et al. |
| 7,126,207 B2 | 10/2006 | Mosley et al. |
| 7,148,269 B2 | 12/2006 | Winey et al. |
| 7,151,625 B2 | 12/2006 | Nagamura et al. |
| 7,153,903 B1 | 12/2006 | Barraza et al. |
| 7,160,531 B1 | 1/2007 | Jacques et al. |
| 2001/0004471 A1 | 6/2001 | Zhang |
| 2001/0010809 A1 | 8/2001 | Haddon et al. |
| 2001/0016283 A1 | 8/2001 | Shiraishi et al. |

| | | | | | |
|---|---|---|---|---|---|
| 2001/0016608 A1 | 8/2001 | Haddon et al. | 2003/0119714 A1 | 6/2003 | Belcher et al. |
| 2001/0031900 A1 | 10/2001 | Margrave et al. | 2003/0122111 A1 | 7/2003 | Glatkowski |
| 2001/0041160 A1 | 11/2001 | Margrave et al. | 2003/0129471 A1 | 7/2003 | Kitade et al. |
| 2002/0004028 A1 | 1/2002 | Margrave et al. | 2003/0133865 A1 | 7/2003 | Smalley et al. |
| 2002/0004556 A1 | 1/2002 | Foulger et al. | 2003/0134736 A1 | 7/2003 | Keller |
| 2002/0008956 A1 | 1/2002 | Niu | 2003/0142456 A1 | 7/2003 | Carnahan |
| 2002/0025490 A1 | 2/2002 | Shchegolikhin et al. | 2003/0144185 A1 | 7/2003 | McGimpsey |
| 2002/0028337 A1 | 3/2002 | Yeager et al. | 2003/0148086 A1 | 8/2003 | Pfefferle et al. |
| 2002/0034757 A1 | 3/2002 | Cubicciotti | 2003/0151030 A1 | 8/2003 | Gurlin |
| 2002/0046872 A1 | 4/2002 | Smalley et al. | 2003/0153965 A1 | 8/2003 | Supronowicz et al. |
| 2002/0048632 A1 | 4/2002 | Smalley et al. | 2003/0155143 A1 | 8/2003 | Fujieda et al. |
| 2002/0049495 A1 | 4/2002 | Kutryk et al. | 2003/0158351 A1 | 8/2003 | Smith et al. |
| 2002/0053257 A1 | 5/2002 | Brice et al. | 2003/0164477 A1 | 9/2003 | Zhou et al. |
| 2002/0053522 A1 | 5/2002 | Cumings et al. | 2003/0168756 A1 | 9/2003 | Balkus, Jr. et al. |
| 2002/0054995 A1 | 5/2002 | Mazurkiewicz | 2003/0170166 A1 | 9/2003 | Smalley et al. |
| 2002/0068170 A1 | 6/2002 | Smalley et al. | 2003/0170167 A1 | 9/2003 | Nikolaev et al. |
| 2002/0081397 A1 | 6/2002 | McGill et al. | 2003/0175803 A1 | 9/2003 | Tsionsky et al. |
| 2002/0081460 A1 | 6/2002 | Feist et al. | 2003/0178607 A1 | 9/2003 | Swager et al. |
| 2002/0085968 A1 | 7/2002 | Smalley et al. | 2003/0180491 A1 | 9/2003 | Hirsch et al. |
| 2002/0086124 A1 | 7/2002 | Margrave et al. | 2003/0180526 A1 | 9/2003 | Winey et al. |
| 2002/0090330 A1 | 7/2002 | Smalley et al. | 2003/0181328 A1 | 9/2003 | Hwang et al. |
| 2002/0090331 A1 | 7/2002 | Smalley et al. | 2003/0183560 A1 | 10/2003 | Hannah |
| 2002/0092613 A1 | 7/2002 | Kuper | 2003/0185741 A1 | 10/2003 | Matyjaszewski et al. |
| 2002/0094311 A1 | 7/2002 | Smalley et al. | 2003/0185985 A1 | 10/2003 | Bronikowski et al. |
| 2002/0098135 A1 | 7/2002 | Smalley et al. | 2003/0186167 A1 | 10/2003 | Johnson, Jr. et al. |
| 2002/0100578 A1 | 8/2002 | Withers et al. | 2003/0203139 A1 | 10/2003 | Ren et al. |
| 2002/0102194 A1 | 8/2002 | Smalley et al. | 2003/0205457 A1 | 11/2003 | Choi et al. |
| 2002/0102196 A1 | 8/2002 | Smalley et al. | 2003/0207984 A1 | 11/2003 | Ding et al. |
| 2002/0102617 A1 | 8/2002 | MacBeath et al. | 2003/0209448 A1 | 11/2003 | Hu et al. |
| 2002/0110513 A1 | 8/2002 | Margrave et al. | 2003/0211028 A1 | 11/2003 | Smalley et al. |
| 2002/0113335 A1 | 8/2002 | Lobovsky et al. | 2003/0211029 A1 | 11/2003 | Someya et al. |
| 2002/0117659 A1 | 8/2002 | Lieber et al. | 2003/0215816 A1 | 11/2003 | Sundararajan et al. |
| 2002/0122765 A1 | 9/2002 | Horiuchi et al. | 2003/0216502 A1 | 11/2003 | McElrath et al. |
| 2002/0127162 A1 | 9/2002 | Smalley et al. | 2003/0218224 A1 | 11/2003 | Schlaf et al. |
| 2002/0127169 A1 | 9/2002 | Smalley et al. | 2003/0220518 A1 | 11/2003 | Bolskar et al. |
| 2002/0136681 A1 | 9/2002 | Smalley et al. | 2003/0227243 A1 | 12/2003 | Perlo et al. |
| 2002/0136683 A1 | 9/2002 | Smalley et al. | 2003/0228467 A1 | 12/2003 | Liebau et al. |
| 2002/0141934 A1 | 10/2002 | Gogotsi et al. | 2004/0000661 A1 | 1/2004 | Sato |
| 2002/0150524 A1 | 10/2002 | Smalley et al. | 2004/0007528 A1 | 1/2004 | Bakajin et al. |
| 2002/0159943 A1 | 10/2002 | Smalley et al. | 2004/0009114 A1 | 1/2004 | Margrave et al. |
| 2002/0167374 A1 | 11/2002 | Hunt et al. | 2004/0013597 A1 | 1/2004 | Mao et al. |
| 2002/0167375 A1 | 11/2002 | Hoppe et al. | 2004/0016912 A1 | 1/2004 | Bandyopadhyay et al. |
| 2002/0172639 A1 | 11/2002 | Horiuchi et al. | 2004/0018139 A1 | 1/2004 | Mancevski |
| 2002/0172963 A1 | 11/2002 | Kelley et al. | 2004/0018371 A1 | 1/2004 | Mao |
| 2002/0176650 A1 | 11/2002 | Zhao et al. | 2004/0018423 A1 | 1/2004 | Bollito et al. |
| 2002/0180077 A1 | 12/2002 | Glatkowski et al. | 2004/0018543 A1 | 1/2004 | Balavoine et al. |
| 2002/0180306 A1 | 12/2002 | Hunt et al. | 2004/0022677 A1 | 2/2004 | Wohlstadter et al. |
| 2002/0197474 A1 | 12/2002 | Reynolds | 2004/0022718 A1 | 2/2004 | Stupp et al. |
| 2003/0001141 A1 | 1/2003 | Sun et al. | 2004/0023610 A1 | 2/2004 | Hu et al. |
| 2003/0008123 A1 | 1/2003 | Glatkowski et al. | 2004/0028599 A1 | 2/2004 | Pierard et al. |
| 2003/0012723 A1 | 1/2003 | Clarke et al. | 2004/0028859 A1 | 2/2004 | LeGrande et al. |
| 2003/0017936 A1 | 1/2003 | Yoon et al. | 2004/0029297 A1 | 2/2004 | Bonnell et al. |
| 2003/0026754 A1 | 2/2003 | Clarke et al. | 2004/0029706 A1 | 2/2004 | Barrera et al. |
| 2003/0039604 A1 | 2/2003 | Niu et al. | 2004/0034177 A1 | 2/2004 | Chen |
| 2003/0039860 A1 | 2/2003 | Cheon et al. | 2004/0035355 A1 | 2/2004 | Avouris et al. |
| 2003/0044608 A1 | 3/2003 | Yoshizawa et al. | 2004/0036056 A1 | 2/2004 | Shea et al. |
| 2003/0052006 A1 | 3/2003 | Noca et al. | 2004/0036128 A1 | 2/2004 | Zhang et al. |
| 2003/0065206 A1 | 4/2003 | Boiskar et al. | 2004/0038007 A1 | 2/2004 | Kotov et al. |
| 2003/0065355 A1 | 4/2003 | Weber et al. | 2004/0038251 A1 | 2/2004 | Smalley et al. |
| 2003/0066956 A1 | 4/2003 | Gruber et al. | 2004/0040834 A1 | 3/2004 | Smalley et al. |
| 2003/0077515 A1 | 4/2003 | Chen et al. | 2004/0041154 A1 | 3/2004 | Watanabe et al. |
| 2003/0083421 A1 | 5/2003 | Kumar et al. | 2004/0048241 A1 | 3/2004 | Freeman et al. |
| 2003/0089890 A1 | 5/2003 | Niu et al. | 2004/0051933 A1 | 3/2004 | Tatsuura et al. |
| 2003/0089893 A1 | 5/2003 | Niu et al. | 2004/0058058 A1 | 3/2004 | Shchegolikhin et al. |
| 2003/0093107 A1 | 5/2003 | Parsonage et al. | 2004/0058457 A1 | 3/2004 | Huang et al. |
| 2003/0101901 A1 | 6/2003 | Bergemann et al. | 2004/0069454 A1 | 4/2004 | Bonignore et al. |
| 2003/0102585 A1 | 6/2003 | Poulin et al. | 2004/0070326 A1 | 4/2004 | Mao et al. |
| 2003/0108477 A1 | 6/2003 | Keller et al. | 2004/0071624 A1 | 4/2004 | Tour et al. |
| 2003/0111333 A1 | 6/2003 | Montgomery et al. | 2004/0071949 A1 | 4/2004 | Glatkowski et al. |
| 2003/0111646 A1 | 6/2003 | Niu et al. | 2004/0076681 A1 | 4/2004 | Dennis et al. |
| 2003/0111946 A1 | 6/2003 | Talin et al. | 2004/0082247 A1 | 4/2004 | Desai et al. |
| 2003/0116757 A1 | 6/2003 | Miyoshi et al. | 2004/0084353 A1 | 5/2004 | Hannah |
| 2003/0118815 A1 | 6/2003 | Rodriguez et al. | 2004/0092329 A1 | 5/2004 | Meyer |

| | | | | | | |
|---|---|---|---|---|---|---|
| 2004/0092330 A1 | 5/2004 | Meyer et al. | | 2005/0002849 A1 | 1/2005 | Mitsui et al. |
| 2004/0101634 A1 | 5/2004 | Park et al. | | 2005/0002851 A1 | 1/2005 | McElrath et al. |
| 2004/0102577 A1 | 5/2004 | Hsu et al. | | 2005/0006623 A1 | 1/2005 | Wong et al. |
| 2004/0105726 A1 | 6/2004 | Hannay et al. | | 2005/0006643 A1 | 1/2005 | Lan et al. |
| 2004/0113127 A1 | 6/2004 | Min et al. | | 2005/0007680 A1 | 1/2005 | Naganuma et al. |
| 2004/0115232 A1 | 6/2004 | Giroud et al. | | 2005/0008919 A1 | 1/2005 | Extrand et al. |
| 2004/0115501 A1 | 6/2004 | Hinokuma et al. | | 2005/0019791 A1 | 1/2005 | Jung et al. |
| 2004/0120100 A1 | 6/2004 | Reynolds, III | | 2005/0022726 A1 | 2/2005 | Wong et al. |
| 2004/0120879 A1 | 6/2004 | Chen et al. | | 2005/0025694 A1 | 2/2005 | Zhang et al. |
| 2004/0121018 A1 | 6/2004 | Grate et al. | | 2005/0026163 A1 | 2/2005 | Sundararajan et al. |
| 2004/0124504 A1 | 7/2004 | Hsu | | 2005/0029498 A1 | 2/2005 | Elkovitch et al. |
| 2004/0127639 A1 | 7/2004 | Hsu et al. | | 2005/0031525 A1 | 2/2005 | Iijima et al. |
| 2004/0131835 A1 | 7/2004 | Schmitt et al. | | 2005/0031526 A1 | 2/2005 | Clarke |
| 2004/0131859 A1 | 7/2004 | Yerushalmi-Rozen et al. | | 2005/0035334 A1 | 2/2005 | Korzhenko et al. |
| 2004/0131934 A1 | 7/2004 | Sugnaux et al. | | 2005/0038171 A1 | 2/2005 | Elkovitch et al. |
| 2004/0132072 A1 | 7/2004 | Zheng et al. | | 2005/0038203 A1 | 2/2005 | Elkovitch et al. |
| 2004/0132845 A1 | 7/2004 | Rhine et al. | | 2005/0038225 A1 | 2/2005 | Charati et al. |
| 2004/0136893 A1 | 7/2004 | Horiuchi et al. | | 2005/0040370 A1 | 2/2005 | Gurin |
| 2004/0136894 A1 | 7/2004 | Yoshizawa et al. | | 2005/0040371 A1 | 2/2005 | Watanabe et al. |
| 2004/0137834 A1 | 7/2004 | Webb et al. | | 2005/0042450 A1 | 2/2005 | Sano et al. |
| 2004/0142172 A1 | 7/2004 | Sugiyama et al. | | 2005/0043503 A1 | 2/2005 | Stoddart et al. |
| 2004/0142285 A1 | 7/2004 | Jung et al. | | 2005/0045030 A1 | 3/2005 | Tonkovich et al. |
| 2004/0146452 A1 | 7/2004 | Fujieda et al. | | 2005/0045477 A1 | 3/2005 | Wei et al. |
| 2004/0146863 A1 | 7/2004 | Pisharody et al. | | 2005/0045877 A1 | 3/2005 | Lyons et al. |
| 2004/0149759 A1 | 8/2004 | Moser et al. | | 2005/0048697 A1 | 3/2005 | Uang et al. |
| 2004/0160156 A1 | 8/2004 | Ohata et al. | | 2005/0053826 A1 | 3/2005 | Wang et al. |
| 2004/0166152 A1 | 8/2004 | Hirsch et al. | | 2005/0061451 A1 | 3/2005 | Busnaina et al. |
| 2004/0167014 A1 | 8/2004 | Yan et al. | | 2005/0062034 A1 | 3/2005 | Dubin |
| 2004/0169151 A1 | 9/2004 | Yagi et al. | | 2005/0064647 A1 | 3/2005 | Manabe et al. |
| 2004/0171779 A1 | 9/2004 | Matyjaszewski et al. | | 2005/0065229 A1 | 3/2005 | Bonnet et al. |
| 2004/0177451 A1 | 9/2004 | Poulin et al. | | 2005/0069669 A1 | 3/2005 | Sakaibara et al. |
| 2004/0179989 A1 | 9/2004 | Height et al. | | 2005/0069701 A1 | 3/2005 | Watanabe et al. |
| 2004/0180201 A1 | 9/2004 | Veedu et al. | | 2005/0070654 A1 | 3/2005 | Hsu |
| 2004/0180244 A1 | 9/2004 | Tour et al. | | 2005/0074390 A1 | 4/2005 | Tour et al. |
| 2004/0184982 A1 | 9/2004 | Burrington et al. | | 2005/0074565 A1 | 4/2005 | Cok |
| 2004/0185342 A1 | 9/2004 | Takeuchi et al. | | 2005/0074613 A1 | 4/2005 | Tour et al. |
| 2004/0186220 A1 | 9/2004 | Smalley et al. | | 2005/0079386 A1 | 4/2005 | Brown, Jr. et al. |
| 2004/0191698 A1 | 9/2004 | Yagi et al. | | 2005/0081625 A1 | 4/2005 | Chen et al. |
| 2004/0194944 A1 | 10/2004 | Hendricks et al. | | 2005/0083635 A1 | 4/2005 | Ooma et al. |
| 2004/0197638 A1 | 10/2004 | McElrath et al. | | 2005/0087726 A1 | 4/2005 | Anazawa et al. |
| 2004/0202603 A1 | 10/2004 | Fischer et al. | | 2005/0089677 A1 | 4/2005 | Marissen et al. |
| 2004/0204915 A1 | 10/2004 | Steinthal et al. | | 2005/0089684 A1 | 4/2005 | Barron et al. |
| 2004/0206941 A1 | 10/2004 | Gurin | | 2005/0090015 A1 | 4/2005 | Hartmann-Thompson |
| 2004/0206942 A1 | 10/2004 | Hsu | | 2005/0090388 A1 | 4/2005 | Kishi et al. |
| 2004/0209782 A1 | 10/2004 | Zhang et al. | | 2005/0093425 A1 | 5/2005 | Sugiyama |
| 2004/0211942 A1 | 10/2004 | Clark et al. | | 2005/0095191 A1 | 5/2005 | Goel et al. |
| 2004/0217336 A1 | 11/2004 | Niu et al. | | 2005/0098204 A1 | 5/2005 | Roscheisen et al. |
| 2004/0217520 A1 | 11/2004 | Hong et al. | | 2005/0098205 A1 | 5/2005 | Roscheisen et al. |
| 2004/0219093 A1 | 11/2004 | Kim et al. | | 2005/0098437 A1 | 5/2005 | Shiepe |
| 2004/0219221 A1 | 11/2004 | Moore et al. | | 2005/0100499 A1 | 5/2005 | Oya et al. |
| 2004/0222080 A1 | 11/2004 | Tour et al. | | 2005/0100501 A1 | 5/2005 | Veedu et al. |
| 2004/0222413 A1 | 11/2004 | Hsu et al. | | 2005/0100960 A1 | 5/2005 | Dai et al. |
| 2004/0223900 A1 | 11/2004 | Khabashesku | | 2005/0103097 A1 | 5/2005 | Faltum et al. |
| 2004/0231975 A1 | 11/2004 | Boyd et al. | | 2005/0107182 A1 | 5/2005 | Meyer et al. |
| 2004/0232073 A1 | 11/2004 | Papadimittrakopoulos | | 2005/0112052 A1 | 5/2005 | Gu et al. |
| 2004/0232389 A1 | 11/2004 | Elkovitch et al. | | 2005/0112451 A1 | 5/2005 | Lee et al. |
| 2004/0240144 A1 | 12/2004 | Schott et al. | | 2005/0113669 A1 | 5/2005 | Helfer et al. |
| 2004/0241080 A1 | 12/2004 | Nagy et al. | | 2005/0113676 A1 | 5/2005 | Weiner et al. |
| 2004/0241896 A1 | 12/2004 | Zhou et al. | | 2005/0113874 A1 | 5/2005 | Connelly et al. |
| 2004/0241900 A1 | 12/2004 | Tsukamoto et al. | | 2005/0113876 A1 | 5/2005 | Weiner et al. |
| 2004/0245085 A1 | 12/2004 | Srinivasan et al. | | 2005/0116214 A1 | 6/2005 | Mammana et al. |
| 2004/0247808 A1 | 12/2004 | Cooper et al. | | 2005/0116336 A1 | 6/2005 | Chopra et al. |
| 2004/0248282 A1 | 12/2004 | Sobha et al. | | 2005/0118372 A1 | 6/2005 | Bonnet et al. |
| 2004/0251042 A1 | 12/2004 | Weiner et al. | | 2005/0118403 A1 | 6/2005 | Anazawa et al. |
| 2004/0254297 A1 | 12/2004 | Hsu et al. | | 2005/0121068 A1 | 6/2005 | Sager et al. |
| 2004/0257307 A1 | 12/2004 | Bae et al. | | 2005/0124020 A1 | 6/2005 | Lee et al. |
| 2004/0258603 A1 | 12/2004 | Yakobson et al. | | 2005/0124535 A1 | 6/2005 | McGimpsey |
| 2004/0262636 A1 | 12/2004 | Yang et al. | | 2005/0127030 A1 | 6/2005 | Watanabe et al. |
| 2004/0265209 A1 | 12/2004 | Colbert et al. | | 2005/0129573 A1 | 6/2005 | Gabriel et al. |
| 2004/0265755 A1 | 12/2004 | Park et al. | | 2005/0129585 A1 | 6/2005 | Jin et al. |
| 2004/0266939 A1 | 12/2004 | Chen et al. | | 2005/0130258 A1 | 6/2005 | Trent et al. |
| 2005/0001100 A1 | 1/2005 | His-Wu et al. | | 2005/0130296 A1 | 6/2005 | Pishharody et al. |
| 2005/0001258 A1 | 1/2005 | Mao et al. | | 2005/0131163 A1 | 6/2005 | Rhine et al. |

| | | | | | |
|---|---|---|---|---|---|
| 2005/0133363 A1 | 6/2005 | Hu et al. | 2005/0263456 A1 | 12/2005 | Cooper et al. |
| 2005/0133372 A1 | 6/2005 | Zhou et al. | 2005/0266605 A1 | 12/2005 | Kawakami |
| 2005/0143508 A1 | 6/2005 | Tyagi et al. | 2005/0271648 A1 | 12/2005 | Sugiyama |
| 2005/0147373 A1 | 7/2005 | Zhang | 2005/0271829 A1 | 12/2005 | Kumar et al. |
| 2005/0147553 A1 | 7/2005 | Wong et al. | 2005/0272143 A1 | 12/2005 | Bureau et al. |
| 2005/0148954 A1 | 7/2005 | Lindsay et al. | 2005/0272856 A1 | 12/2005 | Cooper et al. |
| 2005/0154116 A1 | 7/2005 | Nagy et al. | 2005/0276743 A1 | 12/2005 | Lacombe et al. |
| 2005/0155216 A1 | 7/2005 | Cho et al. | 2005/0277160 A1 | 12/2005 | Shiba et al. |
| 2005/0158390 A1 | 7/2005 | Rana et al. | 2005/0277201 A1 | 12/2005 | Sivarajan et al. |
| 2005/0158612 A1 | 7/2005 | LeCostaouec et al. | 2005/0277675 A1 | 12/2005 | Fuugetsu et al. |
| 2005/0159524 A1 | 7/2005 | Rajagopalan et al. | 2005/0279478 A1 | 12/2005 | Draper et al. |
| 2005/0160798 A1 | 7/2005 | Pasquali et al. | 2005/0284337 A1 | 12/2005 | Shigematsu et al. |
| 2005/0161212 A1 | 7/2005 | Leismer et al. | 2005/0287371 A1 | 12/2005 | Chaudhari et al. |
| 2005/0162606 A1 | 7/2005 | Doane et al. | 2005/0287414 A1 | 12/2005 | Noh |
| 2005/0165155 A1 | 7/2005 | Blanchet-Fincher | 2006/0001013 A1 | 1/2006 | Dupire et al. |
| 2005/0169798 A1 | 8/2005 | Bardley et al. | 2006/0003203 A1 | 1/2006 | Wang et al. |
| 2005/0169830 A1 | 8/2005 | Smalley et al. | 2006/0003401 A1 | 1/2006 | Lee et al. |
| 2005/0169831 A1 | 8/2005 | Montgomery et al. | 2006/0014068 A1 | 1/2006 | Boysen et al. |
| 2005/0170121 A1 | 8/2005 | Bonnet et al. | 2006/0014155 A1 | 1/2006 | Hamers et al. |
| 2005/0170169 A1 | 8/2005 | Watanabe et al. | 2006/0014375 A1 | 1/2006 | Ford et al. |
| 2005/0179594 A1 | 8/2005 | Morikawa et al. | 2006/0016552 A1 | 1/2006 | Barbone et al. |
| 2005/0181209 A1 | 8/2005 | Karandikar | 2006/0019093 A1 | 1/2006 | Zhang et al. |
| 2005/0184294 A1 | 8/2005 | Zhang | 2006/0024503 A1 | 2/2006 | Wong et al. |
| 2005/0186333 A1 | 8/2005 | Douglas | 2006/0025515 A1 | 2/2006 | Scaringe et al. |
| 2005/0186378 A1 | 8/2005 | Bhatt | 2006/0027499 A1 | 2/2006 | Ajayan et al. |
| 2005/0186565 A1 | 8/2005 | Malak | 2006/0029537 A1 | 2/2006 | Zhang et al. |
| 2005/0191490 A1 | 9/2005 | Ton-That et al. | 2006/0032702 A1 | 2/2006 | Linsmeier et al. |
| 2005/0194036 A1 | 9/2005 | Basol | 2006/0033226 A1 | 2/2006 | Wang |
| 2005/0194038 A1 | 9/2005 | Brabec | 2006/0036018 A1 | 2/2006 | Winey et al. |
| 2005/0195354 A1 | 9/2005 | Doane et al. | 2006/0036045 A1 | 2/2006 | Wilson et al. |
| 2005/0203203 A1 | 9/2005 | Bonnet et al. | 2006/0039848 A1 | 2/2006 | Matarredona et al. |
| 2005/0205265 A1 | 9/2005 | Todd et al. | 2006/0040381 A1 | 2/2006 | Zhao et al. |
| 2005/0205860 A1 | 9/2005 | Hsu et al. | 2006/0041050 A1 | 2/2006 | Manane et al. |
| 2005/0207963 A1 | 9/2005 | Tour et al. | 2006/0045838 A1 | 3/2006 | Lucien Malenfant et al. |
| 2005/0208328 A1 | 9/2005 | Hsu et al. | 2006/0047052 A1 | 3/2006 | Barrere et al. |
| 2005/0209388 A1 | 9/2005 | Hsu et al. | 2006/0051579 A1 | 3/2006 | Chokai et al. |
| 2005/0211294 A1 | 9/2005 | Chittibabu et al. | 2006/0052509 A1 | 3/2006 | Saitoh et al. |
| 2005/0212395 A1 | 9/2005 | Anazawa et al. | 2006/0054488 A1 | 3/2006 | Harmon et al. |
| 2005/0214196 A1 | 9/2005 | Ohashi et al. | 2006/0054555 A1 | 3/2006 | Sun |
| 2005/0214197 A1 | 9/2005 | Gu et al. | 2006/0054866 A1 | 3/2006 | Ait-Haddou et al. |
| 2005/0214198 A1 | 9/2005 | Park et al. | 2006/0057016 A1 | 3/2006 | Kumar et al. |
| 2005/0214535 A1 | 9/2005 | Denes et al. | 2006/0057053 A1 | 3/2006 | Otobe et al. |
| 2005/0215718 A1 | 9/2005 | Rajagopalan et al. | 2006/0057055 A1 | 3/2006 | Resasco et al. |
| 2005/0218045 A1 | 10/2005 | Hannah | 2006/0057290 A1 | 3/2006 | Glatkowski et al. |
| 2005/0221038 A1 | 10/2005 | Park | 2006/0057361 A1 | 3/2006 | Ounaies et al. |
| 2005/0221473 A1 | 10/2005 | Dubin et al. | 2006/0058443 A1 | 3/2006 | Ohashi et al. |
| 2005/0222333 A1 | 10/2005 | Hsu | 2006/0062714 A1 | 3/2006 | Tang et al. |
| 2005/0224765 A1 | 10/2005 | Hsu et al. | 2006/0062718 A1 | 3/2006 | Bahr et al. |
| 2005/0224788 A1 | 10/2005 | Hsu et al. | 2006/0062924 A1 | 3/2006 | Horiuchi et al. |
| 2005/0226778 A1 | 10/2005 | Houser et al. | 2006/0062930 A1 | 3/2006 | Kumar et al. |
| 2005/0228110 A1 | 10/2005 | Ko et al. | 2006/0062985 A1 | 3/2006 | Karandikar |
| 2005/0228140 A1 | 10/2005 | Rajagopalan et al. | 2006/0065546 A1 | 3/2006 | Curodeau |
| 2005/0229334 A1 | 10/2005 | Huang et al. | 2006/0065887 A1 | 3/2006 | Tiano et al. |
| 2005/0229335 A1 | 10/2005 | Huang et al. | 2006/0067939 A1 | 3/2006 | Buzatu et al. |
| 2005/0230270 A1 | 10/2005 | Ren et al. | 2006/0067941 A1 | 3/2006 | Buzatu et al. |
| 2005/0233158 A1 | 10/2005 | Tour et al. | 2006/0069199 A1 | 3/2006 | Charati et al. |
| 2005/0234263 A1 | 10/2005 | Prato et al. | 2006/0073089 A1 | 4/2006 | Ajayan et al. |
| 2005/0238810 A1 | 10/2005 | Scaringe et al. | 2006/0081775 A1 | 4/2006 | Joyce et al. |
| 2005/0239948 A1 | 10/2005 | Haik et al. | 2006/0081882 A1 | 4/2006 | Malenfant et al. |
| 2005/0242089 A1 | 11/2005 | Benitsch et al. | 2006/0084742 A1 | 4/2006 | Ishida et al. |
| 2005/0242344 A1 | 11/2005 | Lee et al. | 2006/0084752 A1 | 4/2006 | Ounaies et al. |
| 2005/0244326 A1 | 11/2005 | Colbert et al. | 2006/0094309 A1 | 5/2006 | Holtkamp et al. |
| 2005/0244991 A1 | 11/2005 | Mao et al. | 2006/0098389 A1 | 5/2006 | Liu et al. |
| 2005/0245667 A1 | 11/2005 | Harmon et al. | 2006/0099135 A1 | 5/2006 | Yodh et al. |
| 2005/0245690 A1 | 11/2005 | Rajagopalan et al. | 2006/0099715 A1 | 5/2006 | Munoz et al. |
| 2005/0247237 A1 | 11/2005 | Schukat et al. | 2006/0101489 A1 | 5/2006 | Harutyunyan et al. |
| 2005/0250244 A1 | 11/2005 | Li et al. | 2006/0103641 A1 | 5/2006 | Marhefka et al. |
| 2005/0254760 A1 | 11/2005 | Sakakibara et al. | 2006/0104886 A1 | 5/2006 | Wilson |
| 2005/0255030 A1 | 11/2005 | Tour et al. | 2006/0110537 A1 | 5/2006 | Huang et al. |
| 2005/0255312 A1 | 11/2005 | Fujihara et al. | 2006/0115640 A1 | 6/2006 | Yodh et al. |
| 2005/0257946 A1 | 11/2005 | Kirby et al. | 2006/0115711 A1 | 6/2006 | Kim et al. |
| 2005/0261670 A1 | 11/2005 | Weber et al. | 2006/0116284 A1 | 6/2006 | Pak et al. |
| 2005/0262674 A1 | 12/2005 | Reynolds, III | 2006/0121275 A1 | 6/2006 | Poulin et al. |

| | | |
|---|---|---|
| 2006/0122284 A1 | 6/2006 | Rodriguez-Macias et al. |
| 2006/0122614 A1 | 6/2006 | Truckai et al. |
| 2006/0124025 A1 | 6/2006 | Huang et al. |
| 2006/0124613 A1 | 6/2006 | Kumar et al. |
| 2006/0126175 A1 | 6/2006 | Lu et al. |
| 2006/0127470 A1 | 6/2006 | Hirsch et al. |
| 2006/0131440 A1 | 6/2006 | Yen |
| 2006/0131570 A1 | 6/2006 | Meng |
| 2006/0135030 A1 | 6/2006 | Mao |
| 2006/0135281 A1 | 6/2006 | Palumbo et al. |
| 2006/0135282 A1 | 6/2006 | Palumbo et al. |
| 2006/0135677 A1 | 6/2006 | Huang et al. |
| 2006/0137817 A1 | 6/2006 | Ma et al. |
| 2006/0140847 A1 | 6/2006 | Yang et al. |
| 2006/0142148 A1 | 6/2006 | Ma et al. |
| 2006/0142149 A1 | 6/2006 | Ma et al. |
| 2006/0142466 A1 | 6/2006 | Tour et al. |
| 2006/0145194 A1 | 7/2006 | Barron et al. |
| 2006/0148642 A1 | 7/2006 | Ryu et al. |
| 2006/0151844 A1 | 7/2006 | Avouris et al. |
| 2006/0154195 A1 | 7/2006 | Mather et al. |
| 2006/0154489 A1 | 7/2006 | Tornow et al. |
| 2006/0159612 A1 | 7/2006 | Ziegler et al. |
| 2006/0159921 A1 | 7/2006 | Murthy et al. |
| 2006/0162818 A1 | 7/2006 | Kumar et al. |
| 2006/0165586 A1 | 7/2006 | Wong et al. |
| 2006/0165896 A1 | 7/2006 | Afzali-Ardakani et al. |
| 2006/0166003 A1 | 7/2006 | Khabashesku et al. |
| 2006/0167139 A1 | 7/2006 | Nelson et al. |
| 2006/0167147 A1 | 7/2006 | Asgari |
| 2006/0171874 A1 | 8/2006 | Khabashesku et al. |
| 2006/0172179 A1 | 8/2006 | Gu et al. |
| 2006/0174789 A1 | 8/2006 | Liebau et al. |
| 2006/0175581 A1 | 8/2006 | Douglass |
| 2006/0177946 A1 | 8/2006 | Dubin |
| 2006/0180755 A1 | 8/2006 | Chang et al. |
| 2006/0185714 A1 | 8/2006 | Nam et al. |
| 2006/0188723 A1 | 8/2006 | Rowley et al. |
| 2006/0188774 A1 | 8/2006 | Niu et al. |
| 2006/0189412 A1 | 8/2006 | Sullivan et al. |
| 2006/0192475 A1 | 8/2006 | Lee et al. |
| 2006/0193026 A1 | 8/2006 | Nagamura et al. |
| 2006/0193868 A1 | 8/2006 | Fisher et al. |
| 2006/0194058 A1 | 8/2006 | Amlani et al. |
| 2006/0199770 A1 | 9/2006 | Bianco et al. |
| 2006/0201880 A1 | 9/2006 | Ziegler et al. |
| 2006/0202168 A1 | 9/2006 | Barrera et al. |
| 2006/0205872 A1 | 9/2006 | Elkovitch |
| 2006/0207785 A1 | 9/2006 | Jow et al. |
| 2006/0210466 A1 | 9/2006 | Mitra et al. |
| 2006/0211236 A1 | 9/2006 | Bureau et al. |
| 2006/0211807 A1 | 9/2006 | Koning et al. |
| 2006/0214262 A1 | 9/2006 | Mosley et al. |
| 2006/0219689 A1 | 10/2006 | Huang et al. |
| 2006/0223991 A1 | 10/2006 | Zhang et al. |
| 2006/0228497 A1 | 10/2006 | Kumar et al. |
| 2006/0231399 A1 | 10/2006 | Smalley et al. |
| 2006/0233692 A1 | 10/2006 | Scaring et al. |
| 2006/0235113 A1 | 10/2006 | Dorgan et al. |
| 2006/0237217 A1 | 10/2006 | Glew |
| 2006/0237218 A1 | 10/2006 | Glew |
| 2006/0237219 A1 | 10/2006 | Glew |
| 2006/0237221 A1 | 10/2006 | Glew |
| 2006/0237693 A1 | 10/2006 | O'Hara |
| 2006/0237708 A1 | 10/2006 | Choi et al. |
| 2006/0240305 A1 | 10/2006 | Huang |
| 2006/0249020 A1 | 11/2006 | Tonkovich et al. |
| 2006/0249711 A1 | 11/2006 | Niu et al. |
| 2006/0251568 A1 | 11/2006 | Fahlman |
| 2006/0252853 A1 | 11/2006 | Ajayan et al. |
| 2006/0257556 A1 | 11/2006 | Dai et al. |
| 2006/0257645 A1 | 11/2006 | Asaka et al. |
| 2006/0270777 A1 | 11/2006 | Wise et al. |
| 2006/0270790 A1 | 11/2006 | Comeau |
| 2006/0274049 A1 | 12/2006 | Spath et al. |
| 2006/0275371 A1 | 12/2006 | Dai et al. |
| 2006/0275596 A1 | 12/2006 | Payne et al. |
| 2006/0275956 A1 | 12/2006 | Konesky |
| 2006/0276056 A1 | 12/2006 | Ward et al. |
| 2006/0278444 A1 | 12/2006 | Binstead |
| 2006/0286023 A1 | 12/2006 | Huang |
| 2006/0286297 A1 | 12/2006 | Bronikowski et al. |
| 2006/0291142 A1 | 12/2006 | Grigorian et al. |
| 2006/0292297 A1 | 12/2006 | Mao et al. |
| 2006/0293434 A1 | 12/2006 | Yodh et al. |
| 2007/0003471 A1 | 1/2007 | Kawabata et al. |
| 2007/0004857 A1 | 1/2007 | Barraza et al. |
| 2007/0009379 A1 | 1/2007 | Bau et al. |

FOREIGN PATENT DOCUMENTS

| | | |
|---|---|---|
| EP | 1359121 A2 | 11/2003 |
| EP | 1359169 A3 | 11/2003 |
| EP | 1449887 A1 | 8/2004 |
| JP | 2003096313 | 4/2003 |
| JP | 2003-138040 | 5/2003 |
| JP | 2003292801 | 10/2003 |
| JP | 2004002849 | 1/2004 |
| JP | 2004002850 | 1/2004 |
| WO | WO 99/57222 A1 | 11/1999 |
| WO | WO 00/44094 A1 | 7/2000 |
| WO | WO2001/30694 | 5/2001 |
| WO | WO 02/16257 A2 | 8/2001 |
| WO | WO2001/57917 | 8/2001 |
| WO | WO 02/76888 A1 | 10/2002 |
| WO | WO 02/88025 A1 | 11/2002 |
| WO | WO 02/95099 A1 | 11/2002 |
| WO | WO2004/60988 | 7/2004 |

OTHER PUBLICATIONS

Japanese Office Action and translation of same from Japanese Application JP2003-127132, dated Nov. 30. 2004.

Korean Office Action and translation of same from Korean Application No. 2003-29184, dated Apr. 30, 2005.

U.S Appl. No. 10/920,877, filed Aug. 18, 2004, Ait-Haddou et al.

Ajayan, P. et al., "Single-Walled Carbon Nantube-Polymer Composites: Strength and Weakness", *Adv. Mater* ., (2000), vol. 12, No. 10, pp. 750-753, Wiley-VCH Verlag GmbH.

Andrews et al., "Fabrication of Carbon Multiwall Nanotube/Polymer Composites by Shear Mixing", *Macromolecular Materials and Engineering* , (2002), pp. 395-403, vol. 287, No. 6, Wiley-VCH Verlag GmbH.

Barraza et al., "SWNT-Filled Thermoplastic and Elastomeric Composites Prepared by Miniemulsion Polymerization", *Nano Letters,* (2002), pp. 797-802, vol. 2, No. 8, Americal Chemical Society.

Baughman et al., "Carbon Nanotubes—the Route Toward Applications", *Science*, (2002), pp. 787-792, vol. 297, American Association for the Advancement of Science.

Berber et al., "Unusually High Thermal Conductivity of Carbon Nanotubes", *Physical Review Letters* , (2000), pp. 4613-4616, vol. 84, No. 20, The American Physical Society.

Biercuk et al., "Carbon Nanotube Composites for Thermal Management", *Applied Physics Letters*, (2002), pp. 2767-2769, vol. 80, No. 15, Americal Institute of Physics.

Blanchet et al. "Polyaniline Nanotube Composites: A High-Resolution Printable Conductor", *Applied Physics Letters*, (2003), pp. 1290-1292, vol. 82, No. 8, American Institute of Physics.

Brabec, C.J., et al.: "Photoactive blends of poly(paraphenylenevinylene) (PPV) with methanofullerenes from a novel precursor: photophysics and device performance", *Journal of Chemical Physics*, (2001), pp. 1528-1536, vol. 105, 31.

Chen et al., "Noncovalent Engineering of Carbon Nanotube Surfaces by Rigid, Functional Conjugated Polymers", *Journal of American Chemical Society*, (2002), pp. 9034-9035, vol. 124, No. 131, American Chemical Society.

Chen, et al., Supporting Information for "Noncovalent Engineering of Carbon Nanotube Surface by Rigid, Functional Conjugated Polymers", (2002), pp. S1-S7.

Chen, J. et al., "Noncovalent Engineering of Carbon Nanotube Surfaces", Nanotech 2004 Conference Technical Program Abstract, Summary and Power Point Slides, Mar. 7-11, 2004, Boston, 2004, NSTI Nanotechnology Conference and Trade Show.

U.S. Appl. No. 10/850,721, filed May 21, 2004, Chen et al.

U.S. Appl. No. 10/894,738, filed Jul. 20, 2004, Chen et al.

Chen J., Presentation at 227th ACS National Meeting entitled "Noncovalent Engineering of Carbon Nanotube Surfaces", Anaheim, California, Mar. 31, 2004, (subject matter was identical to above entry).

Coleman et al., "Percolation-Dominated Conductivity in a Conjugated-Polymer-Carbon-Nanotube Composite", *Physical Review B*, (1998), pp. R7492-R7495, vol. 58, No. 12, The American Physical Society.

Dresselhaus, M.S., et al., "Applications of Carbon Nanostructure", *Science of Fullerenes and Carbon Nanotubes*, (1996), pp. 902-905, Academic Press.

Erdogan et al., Synthesis and Mesoscopic Order of a Sugar-Coated Poly (p-phenyleneethynylene)), *Macromolecules* (2002), pp. 7863-7864, American Chemical Society.

Garboczi et al., "Geometrical Percolation Threshold of Overlapping Ellipsoids", *Physical Review E*, (1995), pp. 819-828, vol. 52, No. 1, The American Physical Society.

Harper, C., "Appendix D—Electrical Properties of Resins and Compounds", *Handbook of Plastics, Elastomers, and Composites, 4th Edition*,(2002), pp. 861-863, McGraw-Hill.

Hirsch A., "Functionalization of Single-Walled Carbon Nanotubes", *Angewandte Chemie. International Edition*, (2002), pp. 1853-1859, vol. 41, No. 11, Verlag Chemie. Weinheim, DE.

Kilbride et al., "Experimental Observation of Scaling Laws for Alternating Current and Direct Current Conductivity in Polymer-Carbon Nanotube Composite Thin Films", *Journal of Applied Physics*, (2002), pp. 4024-4030, vol. 92, No. 7, American Institute of Physics.

Kim et al., "Ion-Specific Aggregation in Conjugated Polymers: Highly Sensitive and Selective Fluorescent Ion Chemosensors", *Angew. Chem. Int. Ed.* (2000), pp. 3868-3872, Wiley-VCH Verlag GmbH.

U.S. Appl. No. 60/377,856, Chen et al.

U.S. Appl. No. 60/377,920, Chen et al.

Nikolaev, P. et al., "Gas-phase catalytic growth of single-walled carbon nanotubes from carbon monoside", Chemical Physics Letters 313 (1999) pp. 91-97.

Journet, C. et al., "Production of carbon nanotubes", Appl. Phys. A 67, pp. 1-9, (1998).

Journet, C. et al., "Large-scale production of single-walled carbon nanotubes by the electric-arc technique", Nature, vol. 388, 1997, pp. 756-768.

Rinzler, A.G. et al., "Large-scale purification of single-wall carbon nantubes: process, product, and characterization, " Appl. Phys. A 67, pp. 29-37 (1998).

O'Connell, M. et al., "Reversible water-solubilization of single-walled carbon nanotubes by polymer wrapping," Chemical Physics Letters 342, 2001, pp. 265-271.

Dalton, A. et al., "Selective Interaction of a Semiconjugated Organic Polymer with Single-Walled Nanotubes," J. Phys. Chem. B 2000, 104, pp. 10012-10016.

Star, A. et al., "Preparation and Properties of Polymer-Wrapped Single-Walled Carbon Nanotubes," Angew. Chem. Int. Ed. 2001, 40, No. 9, pp. 1721-1725.

Georgakilas, V. et al., "Organic Functionalization of Carbon Nanotubes," J. Am. Chem. Soc. 2002, vol. 124, No. 5, pp. 760-761.

Boul, P. et al., "Reversible sidewall functionalization of buckytubes," Chemical Physics Letters 310, 1999, pp. 367-372.

Chen, R. et al., "Noncovalent Sidewall Functionalization of Single-Walled Carbon Nanotubes for Protein Immobilization," J. Am. Chem. Soc. 2001, 123, pp. 3838-3839.

Calvert, P., "A recipe for strength," Nature, vol. 399, 1999, pp. 210-211.

Ebbesen, T., "Cones and Tubes: Geometry in the chemistry of Carbon," Acc. Cem. Res. 1999, 31, pp. 558-566.

Bunz, U., "Poly(aryleneethynylene)s: Syntheses, Properties, Structures, and Applications," Chem. Rev. 2000, 100, pp. 1605-1644.

McQuade, d. et al., "Signal Amplification of a 'Turn-on' Sensor: Harvesting the Light Captured by a Conjugated Polymer, " J. Am. Chem. Soc. 2000, 122, pp. 12389-12390.

Schadler, L. et al., "Load transfer in carbon nanotubes epoxy composites," Applied Physics Letters, 1998, vol. 73, No. 26, pp. 3842-3844.

Chen, Y., et al., "Mechanochemical Synthesis of Boron Nitride Nanotubes," Materials Science Forum vols. 312-314 (1999) pp. 173-177; Journal of Metastable and Nanocrystalline Materials vol. 2-6 (1999) pp. 173-177; 1999 Trans Tech Publications, Switzerland.

Han, W. et al., "Synthesis of boron nitride naotubes from carbon nanotubes by a substation reaction," Applied Physics Letters vol. 73, No. 21; pp. 3085-3087, Nov. 23, 1998.

Chen, J. et al., "Solution Properties of Single-Walled Carbon Nanotubes," Science vol. 282 Oct. 2, 1998, pp. 95-98.

Chen, J. et al., "Dissolution of Full-Length Single-Walled Carbon Nanotubes," J. Phys. Chem. B 2001, 105, pp. 2525-2528.

Bahr, J. et al., "Dissolution of Small Diameter Single-Wall Carbon Nanotubes in Organic Solvents?", Chem. Commun. 2001, pp. 193-194.

Ajayan, P.M., "Nanotubes from Carbon," Chem. Rev. 1999, 99, pp. 1787-1799.

Baughman, R. et al., "Carbon Nanotube Actuators," Science 1999, 284, pp. 1340-1344.

Andrews, R. et al., "Nanotube composite carbon fibers," Appl. Phys. Lett, vol. 75, No. 9, 1999, pp. 1329-1331.

Krishnan, et al., "Young's Modulus of Single-Walled Nanotubes", *Physical Review B*, (1998), pp. 14013-14019, vol. 58, No. 20, The Americal Physical Society.

Miller, B., "Tiny Graphite 'Tubes' Create High-Efficiency Conductive Plastics", *Plastics World*, (1996), pp. 73-77, publisher unknown.

Moroni, M. et al., "Rigid Rod Conjugated Polymers for Nonlinear Optics. 3. Intramolecular H Bond Effects on Poly(phenyleneethynylene) Chains", *Macromolecules*, (1997), pp. 1964-1972, vol. 30, American Chemical Society.

Park et al., "Dispersion of Single Wall Carbon Nanotubes by in Situ Polymerization Under Sonication", *Chemical Physical Letters*, (2002)., pp. 303-308, vol. 364, Elsevier Sciences B.V.

Pötschke et al., "Rheological Behavior of Multiwalled Carbon Nanotube/Polycarbonate Composites", *Polymer*, (2002), pp. 3247-3255, vol. 43, Elsevier Science Ltd.

Rajagopal et al., "Homogenous Carbon Nanotube/Polymer Composites for Electrical Applications", *Applied Physics Letters*, (2003), pp. 2928-2930, vol. 83, No. 14, American Institute of Physics.

Rutkofsky et al., "Using a Carbon Nanotube Additive to Make Electrically Conductive Commercial Polymer Composites", 9709 Zyvex Application Note, (Mar. 19, 2004), Zyvex Corporation.

Rutkofsky et al., "Using a Carbon Nanotube Additive to Make as Thermally and Electrically Conductive Polyuerthane", 9711 Zyvex Application Note, (May 5, 2004), Zyvex Corporation.

Shultz, D. et al., "A Modified Procedure for Sonogashira Couplings: Synthesis and Characterization of a Bisporphyrin, 1,1-Bis[zinc(II) 5'-ethynyl-10',15',20'-trimesitylporphyrinyl]methylenecyclohexane", *J. Org. Chem.*, (1998). pp. 4034-4038, vol. 63, American Chemical Society.

Sonogashira, K., et al., "A Convenient Synthesis of Acetylenes: Catalytic Substitutions of Acetylenic Hydrogen With Bromoalkenes, Iodoarenes, and Bromopyridines", *Tetrahedron Letters*, (1975), pp. 4467-4470, No. 50., Pergamon Press, GB.

Watts et al., "The Complex Permittivity of Multi-Walled Carbon Nanotube—Polystyrene Composite Films in X-Band", *Chemical Physics Letters*, (2003), pp. 609-619, vol. 378, Elsevier B.V.

Yakobson et al., "Fullerene Nanotubes: $C_{1,000,000}$ and Beyond", *American Scientist*, (1997), pp. 324-337, vol. 84, Sigma Xi, The Scientific Research Society.

Zhou, Q., et al., "Fluorescent Chemosensors Based on Energy Migration in Conjugated Polymers: The Molecular Wire Approach to Increased Sensitivity", *J. Am. Chem. Soc.,* (1995), pp. 12593-12602, vol. 117, American Chemical Society.

Carbon Nanotube Functionalization faqs On-line Product Display, (2003), Zyvex Corporation (http://www.zyvex.com/products/cnt_faqs_2.html).

Carbon Nanotube Functionalization specifications—Zyvex Dried Film On-line Product Display, (2003), Zyvex Corporation (http://www.zyvex.com/products/zdf_specs. html).

Carbon Nanotube Functionalization features On-line Product Display, Zyvex Dried Film, (2003), Zyvex Corporation. (http://www.zyvex.com/products/zdf_features.html.

Carbon Nanotube Functionalization benefits On-line Product Display, Zyvex Dried Film, (2003), Zyvex Corporation. http://xxx.zyvex.com/products/zdf_benefits.html.

International Search Report in a related PCT Application No. PCT/US2004/016226, mailed Jan. 14, 2005.

Written Opinion of the International Searching Authority in a related PCT Application No. PCT/US2004/016226, mailed Jan. 14, 2005.

Chinese Office Action and translation thereof from Republic of China Application No. 03136785.2, dated Dec. 17, 2004.

Chinese Office Action and translation therof from Republic of China Application No. 03136786.0, dated Jan. 21, 2005.

Korean Office Action and translation thereof from Korean Patent Application No. 10-2003-0029185, dated Aug. 19, 2005.

Ausman et al., "Organic Solvent Dispersions of Single-Walled Carbon Nanotubes: Toward Solutions of Pristine Nanotubes", Phys. Chem. B, 2000, 104, 8911-8915.

Bachtold et al., "Logic Circuits with Carbon Nanotube Transistors" Science 2001, 294, 1317-1320.

Bahr et al., "Functionalization of Carbon Nanotubes by Eletrochemical Reduction of Aryl Diazonium Salts: A Bucky Paper Electrode", J. Am. Chem. Soc. 2001, 123, 6536-6542.

Banhart, "The Formation of a Connection Between Carbon Nanotubes in an Electron Beam," Nano Lett. 2001, 1, 329-332.

Chen et al, "Cyclodextrin-Mediated Soft Cutting of Single-Walled Carbon Nanotubes" J. Am. Chem. Soc. 2001, 123, 6201-6202.

Chen, J. et al., "Room-Temperature Assembly of Directional Carbon Nanotube Strings," J. Am. Chem. Soc. 2002, 124, 758-759.

Cheng et al., "Noncovalent Fuctionalization and Solubilization of Carbon Nanotubes by Using Conjugated Zn-Porphyrin Polymer", Chem. Eur. J. 2006, 12, pp. 5053-5059.

Collins et al., "Engineering Carbon Nanotubes and Nanotube Circuits Using Electrical Breakdown", Science 2001, 292, 706-709.

Collins et al., "Extreme Oxygen Sensitivity of Electronic Properties of Carbon Nanotubes", Science 2000, 287, 1801-1804.

Craighead, "Nanoelectromechanical Systems", Science 2000, 290, 1532-1535.

Derycke et al., "Carbon Nanotube Inter-and Intramolecular Logic Gates", Nano Lett. 2001, 1, 453-456.

Diehl et al., "Self-Assembled, Deterministic Carbon Nanotube Wiring Networks," Angew. Chem. Int. Ed. 2002, 41, 353-356.

Dresselhaus et al., "Science of Fullerenes and Carbon Nanotubes", 1996, San Diego, Academic Press, 901-906.

European Search Report dated Sep. 18, 2003 from EP03252761.

European Search Report dated Sep. 18, 2003 from EP03252762.

Franklin et al., "An Enhanced CVD Approach to Extensive Nanotube Networks with Directionality," Adv. Mater. 2000, 12, 890-894.

Gerdes et al., "Combing a Carbon Nanotube on a Flat Metal-Insulator-Metal Nanojunction", Europhys. Lett., 1999, 48, (3), 292-298.

Haddon et al., "Chemistry of the Fullerenes: The Manifestation of Strain in a class of Continuous Aromatic Molecules", Science, 1993, 261, 1545.

Haddon, "Electronic Properties of Carbon Toroids," Nature, 1997, 388, 31-32.

Haddon, R. C., "Magnetism of the carbon allotropes", Nature 1995, 378, 249-255.

Hamon et al., "Dissolution of Single-Walled Carbon Nanotubes", Advanced Materials, 1999, vol. 11, Issue 10, 834-840.

Holzinger et al., "Sidewall Functionalization of Carbon Nanotubes," Angew. Chem. Int. Ed. 2001, 40, 4002-4005.

Hornyak et al., "Template Synthesis of Carbon Nanotubes", Nanostructed Materials, Elsevier, New York, New York, US, vol. 12, No. 1-4, pp. 83-88, 1999.

Huang et al., "Directed Assembly of One-Dimensional Nanostructures into Functional Networks", Science 2001, 291, 630-633.

Iijima et al., "Structural Flexibility of Carbon Nanotubes", J. Chem. Phys., 1996, 104, No. 5, 2089-2092.

Kim et al., "Micromolding in Capillaries: Applications in Materials Science", J. Am. Chem. Soc. 1996, 118, 5722-5731.

Koishi et al., "Synthesis and Non-Linear Optical Properties of 1,3-and 1,4-disubstituted type of poly(phenyleneethynylene)s containing electron-donor and acceptor group", Macromol. Chem. Phys. 201, 2000, pp. 525-532.

Kong et al. "Nanotube Molecular Wires as Chemical Sensors", Science 2000, 287, 622-625.

Korean Application 29184/2003, Korean Office Action and translation thereof dated Aug. 19, 2005.

Korean Office Action for 29185/2003 dated Feb. 17, 2006.

Kuroda et al., "Synthesis of a nonionic water soluble semiconductive polymer", Chem. Commun., 2003, 26-27.

Lakowicz et al., "Radiative Decay Engineering: Biophysical and Biomedical Applications, " Analytical Biochemistry, 2001, 298, 1-24.

Li et al., "Highly-Ordered Carbon Nanotube Arrays for Electronics Applications," Applied Physics Letters, American Institute of Physics, New York, US, vol. 75, No. 3, pp. 367-369, Jul. 19, 1999.

Liu et al., "Controlled Deposition Individual Single-walled Carbon Nanotubes on Chemically Functionalized Templates", Chem. Phys. Lett., 1999, 303, 125-129.

Liu, J. et al., "Fullerene Pipes", Science, vol. 280, 1998, 1253-1256.

Martel, "Rings of Single-Walled Carbon Nanotubes", Nature, vol. 398, 1999, 299.

Mattson et al., "Molecular Functionalization of Carbon Nanotubes and Use as Substrates for Neuronal Growth", J. Molecular Neuroscience, 2000, 14, 175-182.

Messer et al., "Microchannel Networks for Nanowire Patterning", J. Am. Chem. Soc. 2000, 122, 10232-10233.

Mickelson et al., "Solvation of Fluorinated Single-Wall Carbon Nanotubes in Alcohol Solvents", Phys. Chem. B, 1999, 103, 4318-4322.

Moroni et al., "Rigid Rod Conjugated Polymers for Non-Linear Optics.1. Characterization and Linear Optical Properties of Poly(aryleneethynylene) Derivatives", American Chemical Society, 1994, vol. 27, No. 2, pp. 562-571.

Niyogi, S. et al., "Chromatographic Purification of Soluble Single-Walled Carbon Nanotubes (s-SWNTs)," J. Am. Chem. Soc., 2001, 123, 733-734.

Oh et al., "Stability and cap formation mechanism of single-walled carbon nanotubes", Phys. Rev. B, 1998, 58, No. 11, 7401-7411.

Patent Cooperation Treaty Application PCT/US2002/40789 International Patent Cooperation Traety Search Report dated Apr. 14, 2003.

Patent Cooperation Treaty Application PCT/US2005/01271International Patent Cooperation Treaty Search Report and written Opinion dated Sep. 22, 2005.

Rappe et al., "UFF, a Full Periodic Table Force Firld for Molecular Mechanics and Molecular Dynamics Simulators", J. Am. Chem. Soc. 1992, 114, 100024.

Riggs et al., "Strong Luminescence of Solubilized Carbon Nanotubes", J. Am. Chem. Soc. 2000, 122, 5879-5880.

Roncali, "Synthetic Principles for Bandgap Control in Linear .pi.-Conjugated Systems", Chem. Rev. 1997, 97, pp. 173-205.

Schlittler et al., "Single Crystals of Single-Walled Carbon Nanotubes Formed by Self-Assembly", Science 2001, 292, 1136-1139.

Smith et al., "Formation Mechanism of Fullerene) Peapods and Coaxial Tubes: A Path to Large Scale Synthesis", Chem. Phys. Lett. 2000, 321, 169-174.

Srivastava et al., "Predictions of Enhanced Chemical Reactivity at Regions of Local Conformational Strain on Carbon Nanotubes: Kinky Chemistry", J. Phys. Chem. B., 1999, 103, 4330-4337.

Stephanek, I. et al., "Nano-mechanical cutting and opening of single wall carbon Nanotubes," Chemical Physics Letters 331 (2000), 125-131.

Sun, Y. et al., "Soluble Dendron-Functionalized Carbon Nanotubes: Preparation, Characterization, and Properties," Chem. Mater. 2001, 13, 2864-2869.

Sutton et al., "On the morphology and growth of electrochemically polymerized polypyrrole", Polymer vol. 36, No. 9, pp. 1849-1857, 1995.

Szejtli, J., "Introduction and general overview of Cyclodextrin Chemistry," Chem. Rev. 1998, 98, 1743-1753.

Tang et al., "Preparation, Alignment, and Optical Properties of Soluble Poly (phenylacetylene)-Wrapped Carbon Nanotubes",Macromolecules 1999, 32, 2569-2576.

Tang et al., "Superconductivity in 4 Angstrom Single-Walled Carbon Nanotubes," Science 2001, 2462-2465.

Tasis et al., "Chemistry of Carbon Nanotubes", American Chemical Society, B Chemical Reviews, Published on the Web Feb. 23, 2006, pp. 1-32.

Taylor et al., "Synthesis and Characterization of Poly (p-phenylene)s with Nonlinear Optical Side Chains", Macromolecules 2000, 33, pp. 2355-2358.

Tombler et al., "Reversible Electromechanical Characteristics of Carbon Nanotubes Under Local-Probe Manipulation", Nature 2000, 405, 769-772.

Waldeck, D. H., et al., "Nonradiative damping of molecular electronic excited states by metal surfaces,"Surf. Sci. 1985, 158, 103.

Wong et al., "Covalently-Functionalized Single-Walled Carbon Nanotubes Probe Tips for Chemical Force Microscopy", J. Am. Chem. Soc., 1998, 120, 8557-8558.

Wu et al., "Synthesis of Carboxyl-Containing Conducting Oligomer and Non-Covalent Sidewall Functionalization of Single-Walled Carbon Nanotubes", Journal of Materials Chemistry, 2005, 15, pp. 1833-1873.

Yamamoto et al., "Preparation of Pi-Conjugated Polymers Composed of Hydroquinone, ρ-Benzoquinone, and ρ-Diacetoxyphenylene Units. Optical Redox Properties of the Polymers", Macromolecules, American Chemical society, 1999, 32, 5556-8896.

Yang et al. "Efficient Blue Polymer Light-Emitting Diodes from a series of soluble Poly(paraphenylene)s", Journal of Applied Physics -- Jan. 15, 1996 -- vol. 79, Issue 2, pp. 934-939.

Zhang et al., "Electric-Field-Directed Growth of Aligned Single-Walled Carbon Nanotubes", Applied Physics Letters, vol. 79, No. 19, 2001, 3155-3157.

Zhao et al., "Chromotographic Purification and Properties of Soluble Single-Walled Carbon Nanotubes,"J. Am. Chem. Soc. 2001, 123, 11673-11677.

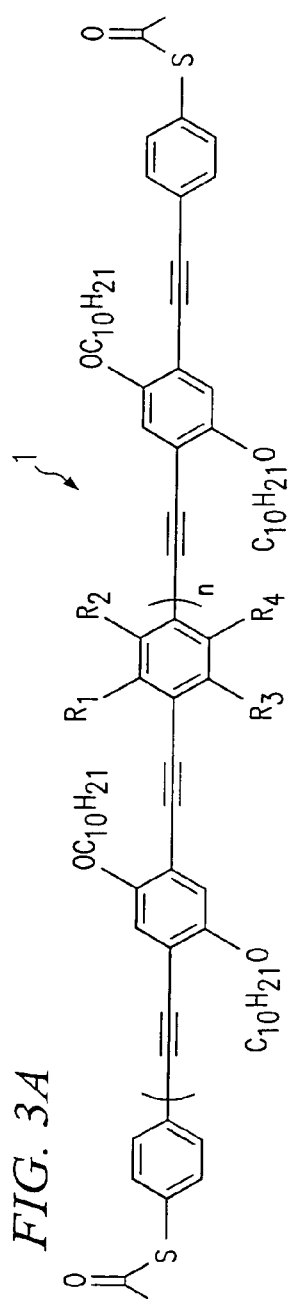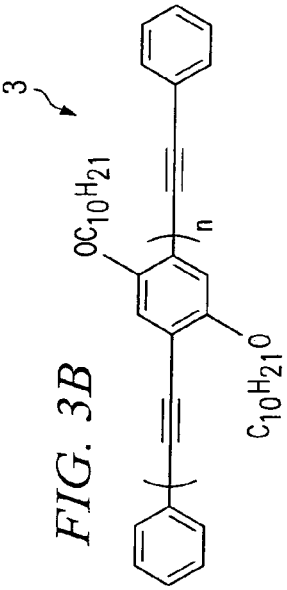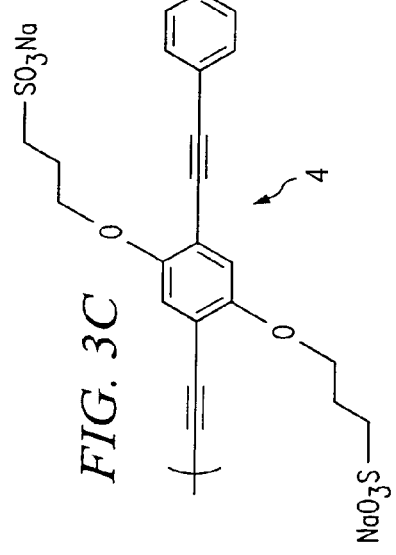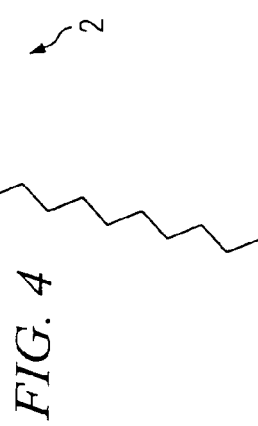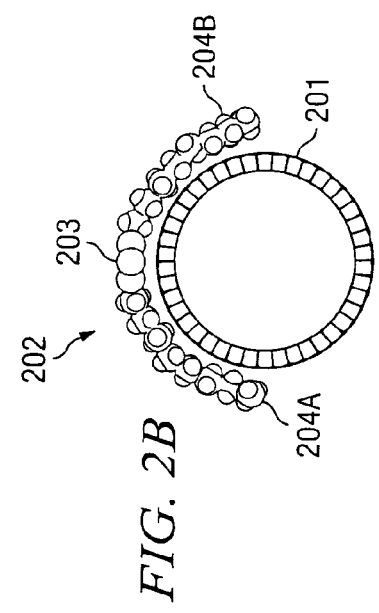
FIG. 3A
FIG. 3B
FIG. 3C
FIG. 4
FIG. 2B

POLYMER AND METHOD FOR USING THE POLYMER FOR SOLUBILIZING NANOTUBES

CROSS-REFERENCE TO RELATED APPLICATIONS

This application is a continuing application of U.S. patent application Ser. No. 10/255,122 filed Sep. 24, 2002 now abandoned, which application claimed priority to Provisional Patent Application Ser. No. 60/377,856 entitled "SYSTEM AND METHOD FOR DISSOLUTION OF NANOTUBES", filed May 2, 2002 and Provisional Patent Application Ser. No. 60/377,920 entitled "SYSTEM AND METHOD FOR FUNCTIONALIZATION OF NANOTUBE SURFACES", filed May 2, 2002, the entire disclosures of which are hereby incorporated herein by reference.

TECHNICAL FIELD

The present invention is related to solubilization of nanotubes, and more particularly to a polymer that is capable of solubilizing nanotubes.

BACKGROUND OF THE INVENTION

A carbon nanotube can be visualized as a sheet of hexagonal graph paper rolled up into a seamless tube and joined. Each line on the graph paper represents a carbon-carbon bond, and each intersection point represents a carbon atom.

In general, carbon nanotubes are elongated tubular bodies which are typically only a few atoms in circumference. The carbon nanotubes are hollow and have a linear fullerene structure. The length of the carbon nanotubes potentially may be millions of times greater than their molecular-sized diameter. Both single-walled carbon nanotubes (SWNTs), as well as multi-walled carbon nanotubes (MWNTs) have been recognized.

Carbon nanotubes are currently being proposed for a number of applications since they possess a very desirable and unique combination of physical properties relating to, for example, strength and weight. Carbon nanotubes have also demonstrated electrical conductivity. See Yakobson, B. I., et al., *American Scientist*, 85, (1997), 324–337; and Dresselhaus, M. S., et al., Science of Fullerenes and Carbon Nanotubes, 1996, San Diego: Academic Press, pp. 902–905. For example, carbon nanotubes conduct heat and electricity better than copper or gold and have 100 times the tensile strength of steel, with only a sixth of the weight of steel. Carbon nanotubes may be produced having extraordinarily small size. For example, carbon nanotubes are being produced that are approximately the size of a DNA double helix (or approximately $1/50,000^{th}$ the width of a human hair).

Considering the excellent properties of carbon nanotubes, they are well suited for a variety of uses, from the building of computer circuits to the reinforcement of composite materials, and even to the delivery of medicine. As a result of their properties, carbon nanotubes may be useful in microelectronic device applications, for example, which often demand high thermal conductivity, small dimensions, and light weight. One potential application of carbon nanotubes that has been recognized is their use in flat-panel displays that use electron field-emission technology (as carbon nanotubes can be good conductors and electron emitters). Further potential applications that have been recognized include electromagnetic shielding, such as for cellular telephones and laptop computers, radar absorption for stealth aircraft, nano-electronics (including memories in new generations of computers), and use as high-strength, lightweight composites. Further, carbon nanotubes are potential candidates in the areas of electrochemical energy storage systems (e.g., lithium ion batteries) and gas storage systems.

Various techniques for producing carbon nanotubes have been developed. As examples, methods of forming carbon nanotubes are described in U.S. Pat. Nos. 5,753,088 and 5,482,601, the disclosures of which are hereby incorporated herein by reference. The three most common techniques for producing carbon nanotubes are: 1) laser vaporization technique, 2) electric arc technique, and 3) gas phase technique (e.g., HiPco™ process), which are discussed further below.

In general, the "laser vaporization" technique utilizes a pulsed laser to vaporize graphite in producing the carbon nanotubes. The laser vaporization technique is further described by A. G. Rinzler et al. in *Appl. Phys. A*, 1998, 67, 29, the disclosure of which is hereby incorporated herein by reference. Generally, the laser vaporization technique produces carbon nanotubes that have a diameter of approximately 1.1 to 1.3 nanometers (nm). Such laser vaporization technique is generally a very low yield process, which requires a relatively long period of time to produce small quantities of carbon nanotubes. For instance, one hour of laser vaporization processing typically results in approximately 100 milligrams of carbon nanotubes.

Another technique for producing carbon nanotubes is the "electric arc" technique in which carbon nanotubes are synthesized utilizing an electric arc discharge. As an example, single-walled nanotubes (SWNTs) may be synthesized by an electric arc discharge under helium atmosphere with the graphite anode filled with a mixture of metallic catalysts and graphite powder (Ni:Y;C), as described more fully by C. Journet et al. in *Nature* (London), 388 (1997), 756. Typically, such SWNTs are produced as close-packed bundles (or "ropes") with such bundles having diameters ranging from 5 to 20 nm. Generally, the SWNTs are well-aligned in a two-dimensional periodic triangular lattice bonded by van der Waals interactions. The electric arc technique of producing carbon nanotubes is further described by C. Journet and P. Bernier in *Appl. Phys. A*, 67, 1, the disclosure of which is hereby incorporated herein by reference. Utilizing such an electric arc technique, the average carbon nanotube diameter is typically approximately 1.3 to 1.5 nm and the triangular lattice parameter is approximately 1.7 nm. As with the laser vaporization technique, the electric arc production technique is generally a very low yield process that requires a relatively long period of time to produce small quantities of carbon nanotubes. For instance, one hour of electric arc processing typically results in approximately 100 milligrams of carbon nanotubes.

More recently, Richard Smalley and his colleagues at Rice University have discovered another process, the "gas phase" technique, which produces much greater quantities of carbon nanotubes than the laser vaporization and electric arc production techniques. The gas phase technique, which is referred to as the HiPco™ process, produces carbon nanotubes utilizing a gas phase catalytic reaction. The HiPco process uses basic industrial gas (carbon monoxide), under temperature and pressure conditions common in modern industrial plants to create relatively high quantities of high-purity carbon nanotubes that are essentially free of by-products. The HiPco process is described in further detail by P. Nikolaev et al. in *Chem. Phys. Lett.*, 1999, 313, 91, the disclosure of which is hereby incorporated herein by reference.

While daily quantities of carbon nanotubes produced using the above-described laser vaporization and electric arc techniques are approximately 1 gram per day, the HiPco process may enable daily production of carbon nanotubes in quantities of a pound or more. Generally, the HiPco technique produces carbon nanotubes that have relatively much smaller diameters than are typically produced in the laser vaporization or electric arc techniques. For instance, the nanotubes produced by the HiPco technique generally have diameters of approximately 0.7 to 0.8 nm.

Full-length (unshortened) carbon nanotubes, due to their high aspect ratio, small diameter, light weight, high strength, high electrical- and thermal-conductivity, are recognized as the ultimate carbon fibers for nanostructured materials. See Calvert, P. Nature 1999, 399, 210, and Andrews, R. et al. Appl. Phys. Lett. 199, 75, 1329, the disclosures of which are hereby incorporated herein by reference. The carbon nanotube materials, however, are insoluble in common organic solvents. See Ebbesen, T. W. Acc. Chem. Res. 1998, 31, 558–556, the disclosure of which is hereby incorporated herein by reference.

Covalent side-wall functionalizations of carbon nanotubes can lead to the dissolution of carbon nanotubes in organic solvents. It should be noted that the terms "dissolution" and "solubilization" are used interchangeably herein. See Boul, P. J. et al., Chem Phys. Lett. 1999, 310, 367 and Georgakilas, V. et al., J. Am. Chem. Soc. 2002, 124, 760–761, the disclosures of which are hereby incorporated herein by reference. The disadvantage of this approach is that a carbon nanotube's intrinsic properties are changed significantly by covalent side-wall functionalizations.

Carbon nanotubes can also be solubilized in organic solvents and water by polymer wrapping. See Dalton, A. B. et al., J. Phys. Chem. B 2000, 104, 10012–10016, Star, A. et al. Angew. Chem., Int. Ed. 2001, 40, 1721–1725, and O'Connell, M. J. et al. Chem. Phys. Lett. 2001, 342, 265–271, the disclosures of which are hereby incorporated herein by reference. FIGS. 1A–1C show examples of such polymer wrapping of a carbon nanotube. In polymer wrapping, a polymer "wraps" around the diameter of a carbon nanotube. For instance, FIG. 1 shows an example of polymers 102A and 102B wrapping around single-walled carbon nanotube (SWNT) 101. FIG. 1B shows an example of polymer 103A and 103B wrapping around SWNT 101. FIG. 1C shows an example of polymers 104A and 104B wrapping around SWNT 101. It should be noted that the polymers in each of the examples of FIGS. 1A–1C are the same, and the FIGURES illustrate that the type of polymer-wrapping that occurs is random (e.g., the same polymers wrap about the carbon nanotube in different ways in each of FIGS. 1A–1C). One disadvantage of this approach is that the polymer is very inefficient in wrapping the small-diameter single-walled carbon nanotubes produced by the HiPco process because of high strain conformation required for the polymer. For example, such polymer wrapping approach can only solubilize the SWNTs$_{HiPco}$ (i.e., SWNTs produced by the HiPco process) at about 0.1 mg/ml in organic solvents. SWNT$_{HiPco}$ is the only SWNT material that can be currently produced at a large scale with high purity.

BRIEF SUMMARY OF THE INVENTION

The present invention is directed to a method for solubilizing nanotubes, a polymer for solubilizing nanotubes, and resulting compositions of matter that may be formed using solubilized nanotubes. Embodiments of the present invention provide a new approach to solubilizing nanotubes, such as carbon nanotubes, in solvents. The solvents can be, in principle, any solvents. Solubilization of carbon nanotubes in accordance with embodiments of the present invention have been experimentally demonstrated in organic solvents and in water. In accordance with certain embodiments of the present invention, carbon nanotube surfaces are functionalized in a non-wrapping fashion by functional conjugated polymers that include functional groups for solubilizing such nanotubes. As used herein, "non-wrapping" means not enveloping the diameter of a nanotube. Thus, associating a polymer with a nanotube in a "non-wrapping fashion" encompasses any association of the polymer with the nanotube in which the polymer does not completely envelop the diameter of the nanotube. When describing certain embodiments of the present invention, the non-wrapping fashion may be further defined and/or restricted. For instance, in a preferred embodiment of the present invention, a polymer can associate with a nanotube (e.g., via π-stacking interaction therewith) wherein the polymer's backbone extends substantially along the length of the nanotube without any portion of the backbone extending over more than half of the nanotube's diameter in relation to any other portion of the polymer's backbone.

Various embodiments provide polymers that associate with carbon nanotubes in a non-wrapping fashion. More specifically, various embodiments of polymers are provided that comprise a relatively rigid backbone that is suitable for associating with a carbon nanotube substantially along the nanotube's length, as opposed to about its diameter. In preferred polymers, the major interaction between the polymer backbone and the nanotube surface is parallel π-stacking. Such interaction may result in the polymer non-covalently bonding (or otherwise associating) with the nanotube. Examples of rigid functional conjugated polymers that may be utilized in embodiments of the present invention include, without limitation, poly(aryleneethynylene)s and poly(3-decylthiophene). In accordance with embodiments of the present invention, the polymers further comprise at least one functional extension from the backbone, wherein such at least one function extension comprises any of various desired functional groups that are suitable for solubilizing a carbon nanotube.

In one embodiment of the present invention, a method of solubilizing a nanotube is disclosed. The method comprises mixing a polymer with a nanotube, and the polymer non-covalently bonding with the nanotube in a non-wrapping fashion, wherein the polymer comprises at least one functional portion for solubilizing the nanotube. As used herein, "mixing" is intended to encompass "adding," "combining," and similar terms for presenting at least one polymer to at least one nanotube.

In another embodiment of the present invention, a polymer for solubilizing nanotubes is disclosed. The polymer comprises a backbone portion for noncovalently bonding with a nanotube in a non-wrapping fashion, and at least one functional portion for solubilizing the nanotube.

In another embodiment, a process is disclosed that comprises mixing at least one polymer with at least one nanotube in a solvent. In certain embodiments, the solvent may comprise an organic solvent, and in other embodiments the solvent may comprise an aqueous solvent. The mixing results in the at least one polymer forming a noncovalent bond with the at least one nanotube in a non-wrapping fashion, and the at least one polymer solubilizing the at least one nanotube.

In another embodiment, a method of solubilizing carbon nanotubes is provided. The method comprises mixing at least one polymer with at least one carbon nanotube in a solvent. Again, in certain embodiments, the solvent may comprise an organic solvent, and in other embodiments the solvent may comprise an aqueous solvent. The method further comprises the at least one polymer interacting with the at least one carbon nanotube's surface via π-stacking, and the at least one polymer solubilizing the at least one carbon nanotube.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 2A–2B show an example molecular model of a polymer that associates with a carbon nanotube in a non-wrapping fashion in accordance with an embodiment of the present invention;

FIGS. 3A–3C show example polymer structures of embodiments of the present invention;

FIG. 4 shows another example of a polymer structure that may be implemented for associating with a carbon nanotube in a non-wrapping fashion in accordance with an embodiment of the present invention;

DETAILED DESCRIPTION OF THE INVENTION

Figure 1A:
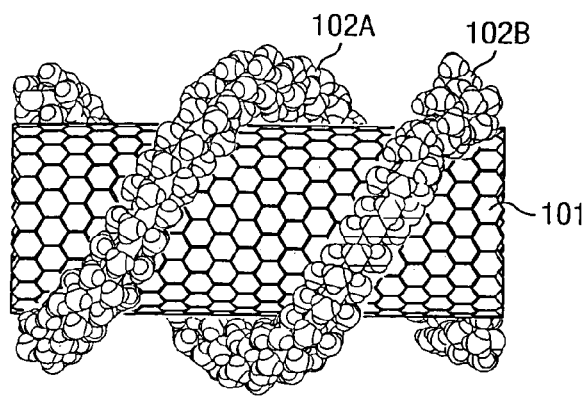
FIGS. 1A–1C show examples of polymer wrapping of carbon nanotubes of the prior art.
Figure 1B:
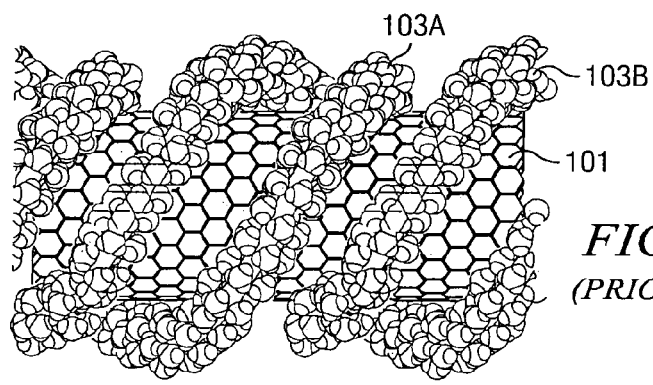
Figure 1C:
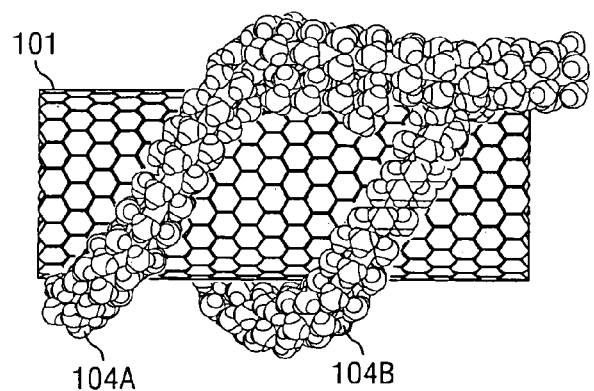
Figure 2A:
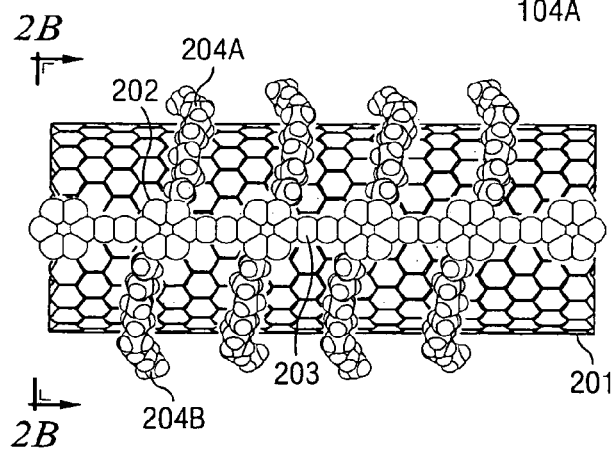

Various embodiments of the present invention are now described with reference to the above figures. Embodiments of the present invention provide a new approach to solubilizing nanotubes in solvents. Advantageously, certain embodiments of the present invention may enable solubilization in organic solvents, and certain embodiments may enable solubilization in aqueous solvents. This approach is based on a discovery that carbon nanotube surfaces can be functionalized in a non-wrapping fashion by functional conjugated polymers. For instance, an example molecular model of a polymer that associates (e.g., noncovalently bonds) with a carbon nanotube in a non-wrapping fashion is shown in FIGS. 2A–2B. FIG. 2B is a cross-sectional view of FIG. 2A taken as indicated in FIG. 2A. As shown in this example, a carbon nanotube (and more specifically a single-walled carbon nanotube in this example) 201 has polymer 202 associated with it in a non-wrapping fashion therewith.

Polymer 202 comprises a relatively rigid backbone 203 that associates with carbon nanotube 201 substantially along the length, as opposed to about the diameter, of such carbon nanotube 201. Thus, polymer 202 associates with carbon nanotube 201 in a non-wrapping fashion, which is advantageous for various reasons, some of which are described more fully herein. In this example, backbone 203 associates with nanotube 201 (e.g., via π-stacking interaction therewith) wherein such backbone 203 extends substantially along the length of nanotube 201 without any portion of backbone 203 extending over more than half of the diameter of nanotube 201 in relation to any other portion of backbone 203. For instance, backbone 203 is sufficiently rigid such that no portion thereof bends to the extent that such portion passes the half-diameter (or "equator line") 205 of nanotube 201 relative to location 206 of nanotube 201 at which at least a portion of backbone 203 is associated with nanotube 201. The specific rigidity of various backbones 203 that may be implemented in accordance with embodiments of the present invention may vary (e.g., certain implementations may enable a portion of backbone 203 to bend beyond half-diameter 205 while another portion of such backbone is arranged at location 206 of nanotube 201), but such backbones 203 are preferably sufficiently rigid such that they do not wrap (i.e., fully envelop the diameter of) nanotube 201. Of course, as shown in the example of FIGS. 2A–2B, portions of polymer 202 (e.g., functional extensions 204A and 204B) may extend about all or a portion of the diameter of nanotube 201, but backbone 203 of polymer 202 is preferably sufficiently rigid such that it does not wrap about the diameter of nanotube 201.

Polymer 202 further comprises various functional extensions from backbone 203, such as functional extensions 204A and 204B, which may comprise any of various desired functional groups for functionalizing carbon nanotube 201.

As described further herein, embodiments of the present invention include functional groups in polymer 202 that are suitable for solubilizing carbon nanotube 201.

One advantage of polymer 202 associating with carbon nanotube 201 (e.g., via π-stacking interaction) in a non-wrapping fashion is that it enables functional groups, such as functional extensions 204A and 204B, to be arranged along backbone 203 in a desired manner to accurately control the spacing of such functional groups. In polymers that associate with a carbon nanotube in a wrapping fashion, it becomes much more difficult to control the relative spacing of the functional groups arranged on the polymer because their spacing is dependent on the wrapping of the polymer. By controlling the spacing of such functional groups along backbone 202, more control may be provided over if/how the functional groups interact with each other, carbon nanotube 201, and/or other elements to which the functional groups may be exposed.

Another advantage of such noncovalent functionalization of carbon nanotubes is that it allows for a significant degree of functionalization to be added to carbon nanotube surfaces (sidewalls) while still preserving nearly all of the nanotubes' intrinsic properties. That is, as described above, carbon nanotubes possess a very desirable and unique combination of physical properties relating to, for example, strength, weight, electrical conductivity, etc. Having the ability to solubilize carbon nanotubes while preserving nearly all of the nanotubes' properties thus offers many possibilities in, for example, material science. For instance, in certain applications, carbon nanotubes may be solubilized and thus used in forming a desired composition of matter (or "material") that has desired properties supplied at least in part by the nanotubes, some examples of which are described further below.

As an example of a technique for solubilizing carbon nanotubes, I have conducted a study in which I used rigid functional conjugated polymers, poly(aryleneethynylene)s (also referred to as "1", "3", "4" herein). See Bunz, U.H.F. Chem. Rev. 2000, 100, 1605–1644 and McQuade, D. T. et al., J. Am. Chem. Soc. 2000, 122, 12389–12390, the disclosures of which are hereby incorporated herein by reference, and poly(3-decylthiophene) (also referred to as "2" herein). FIGS. 3A–3C show example polymer structures of embodiments of the present invention. More specifically, FIG. 3A shows an example poly(aryleneethynylene) (labeled "1") polymer structure that may be used to noncovalently bond with a carbon nanotube in a non-wrapping fashion. The example polymer structure shown in FIG. 3A comprises functional extensions $R_1$, $R_2$, $R_3$, and $R_4$, which may, in alternative example implementations for solubilizing carbon nanotubes, be implemented as either $1a$, $1b$, $1c$, or $1d$ shown hereafter:

(1a) $R_1=R_4=H$, $R_2=R_3=OC_{10}H_{21}$ (1b) $R_1=R_2=R_3=R_4=F$

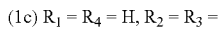

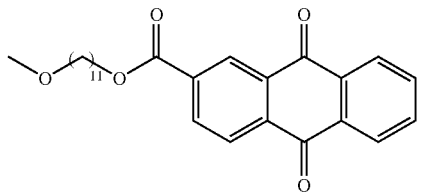

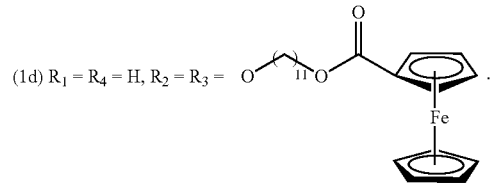

FIG. 3B shows another example poly(aryleneethynylene) (labeled "3" and referred to herein as "3") polymer structure that may be used to noncovalently bond with a carbon nanotube in a non-wrapping fashion. Further, FIG. 3C shows another example poly(aryleneethynylene) (labeled "4" and referred to herein as "4") polymer structure that may be used to noncovalently bond with a carbon nanotube in a non-wrapping fashion. While the example polymer structures 1, 3, and 4 shown in FIGS. 3A–3C are poly(phenyleneethynylene) structures, it should be understood that other poly(aryleneethynylene)-type structures may be used in accordance with embodiments of the present invention.

The example polymer structures of FIGS. 3A–3C may be implemented for noncovalently bonding with a carbon nanotube in a non-wrapping fashion, as with the example shown in FIGS. 2A–2B, for solubilizing such carbon nanotube. Indeed, the example molecular model of FIGS. 2A–2B illustrates an example of implementation 1a, described above, of the polymer of FIG. 3A, and more specifically it shows an example of implementation $1a_{n=1.5}$-SWNT$_{(6,6)}$ complex (i.e., armchair SWNT), wherein n is the repeat number. It should be understood that the present invention is not intended to be limited solely to the functional groups of 1a, 1b, 1c, and 1d (or the functional groups of polymer structures 3 and 4) shown above for solubilizing carbon nanotubes, but rather any such functional group now known or later developed for solubilizing carbon nanotubes may be used in accordance with embodiments of the present invention. Preferably, the solubilizing functional group(s) included in the polymer do not substantially alter the intrinsic properties of the carbon nanotube.

FIG. 4 shows another example of a polymer structure that may be implemented for noncovalently bonding with a carbon nanotube in a non-wrapping fashion. More specifically, FIG. 4 shows an example structure of a highly regioregular head-to-tail poly(3-decylthiophene) (labeled "2") that may be implemented in certain embodiments of the present invention.

In contrast to previous work, See Dalton, Star, and O'Connell, M. J. et al., the backbone of 1, 2, 3, and 4 described above is rigid and cannot wrap around the SWNTs, and the major interaction between the polymer backbone and the nanotube surface is parallel π-stacking. Further, the example backbones 5–18 described below are also rigid such that they do not wrap around the nanotube, and the major interaction between such polymer backbones and the nanotube surface is parallel π-stacking. Parallel π-stacking is one type of noncovalent bonding. See Chen, R. J. et al., J. Am. Chem. Soc., 2001, 123, 3838–3839, the disclosure of which is hereby incorporated herein by reference. The techniques disclosed herein utilize such polymers to enable the dissolution (or "solubilization") of various types of carbon nanotubes in organic solvents (such as $CHCl_3$, chlorobenzene etc), which represents the first example of solubilization of carbon nanotubes via π-stacking without polymer wrapping.

As an example, SWNTs can be readily solubilized in CHCl₃ by mixing with 1 (e.g., 1a, 1b, 1c, or 1d), 2, 3, or 4 after vigorous shaking and/or bath-sonication. The minimum weight ratio ($WR_{initial}$) of 1: $SWNTs_{HipCo}$, 2: $SWNTs_{HiPco}$, 3: $SWNTs_{HiPco}$, and 4: $SWNTs_{HiPco}$ required to solubilize the $SWNTs_{HiPco}$ (i.e., SWNTs produced by the HiPco technique) is about 0.4; and the maximum concentration of $SWNTs_{HiPco}$ in CHCl₃ is about 5 mg/ml for 1d, which represents the highest solubility of $SWNTs_{HiPco}$ in organic solvents by noncovalent functionalization. As examples, 13.6 mg of $SWNTs_{HiPco}$ can be dissolved in 6.8 ml of CHCl₃ in the presence of 5.4 mg of 1a; and 20.4 mg of $SWNTs_{HiPco}$ can be dissolved in 4.0 ml of CHCl₃ in the presence of 20.4 mg of 1d. The maximum concentration of $SWNTs_{laser}$ (i.e., SWNTs produced by the laser technique) and $SWNTs_{arc}$ (i.e., SWNTs produced by the arc technique) is about 0.5 mg/ml for 1a. The solubility of SWNTs can be further improved by optimizing the polymer side chain's length and composition. For example, the longer side chains and/or the side chains with branched structures can further improve the solubility of the SWNTs.

As another example, SWNTs can be readily solubilized in deionized water by mixing with 4 after bath-sonication. For example, 13.7 mg of $SWNTs_{HiPco}$ can be dissolved in 6.9 ml of deionized water in the presence of 13.7 mg of 4.

The new polymers (1a-1, $n_{average}$=19.5; 1a-2, $n_{average}$=13; 1b, $n_{average}$=19; 1c, $n_{average}$=19; 1d) were synthesized and characterized according to known methods. See Bunz, U.H.F. Chem. Rev. 2000, 100, 1605–1644, the disclosure of which is hereby incorporated herein by reference. Three types of SWNTs were used in this study: 1) purified HiPco-SWNTs ("$SWNTs_{HiPco}$", from Carbon Nanotechnologies, Inc.); 2) purified laser-grown SWNTs ("$SWNTs_{laser}$"); and 3) purified electric arc-grown SWNTs ("$SWNTs_{arc}$"). As an example preparation procedure for 1a-$SWNTs_{HiPco}$ complex: 14.7 mg of $SWNTs_{HiPco}$ was sonicated in 29.4 ml of CHCl₃ for 30 minutes ("min") to give an unstable suspension of visible insoluble solids. 14.7 mg of 1a was then added and most of the visible insoluble solids became soluble simply by vigorous shaking. The resulting solution was further sonicated for 10–30 min to give a black-colored stable solution with no detectable solid precipitation for over 10 days. Such resulting black-colored and unsaturated carbon nanotube solution was visually nonscattering and no precipitation occurred upon prolonged standing (e.g., over 10 days). The product was collected by PTFE membrane filtration (0.2–0.8 μm pore size), washed with CHCl₃, and dried at room temperature under vacuum to give 20.6 mg of free-standing black solid film (bucky paper).

The procedures followed in my study for 2-$SWNTs_{HiPco}$, 1c-$SWNTs_{HiPco}$, 1b-$SWNTs_{HiPco}$, 1d-$SWNTs_{HiPco}$, 3-$SWNTs_{HiPco}$, 1a-$SWNTs_{laser}$ and 1a-$SWNTs_{arc}$ are similar to that described above for 1a-$SWNTs_{HiPco}$. The as-prepared $SWNTs_{HiPco}$ and CVD-grown multi-walled carbon nanotubes (MWNTs) can also be solubilized in CHCl₃ by a similar procedure. The as-prepared $SWNTs_{arc}$, however, form an unstable suspension using a similar procedure, presumably due to the amorphous carbon coating on nanotubes that prevents the efficient π-π interaction between 1 and the nanotube surfaces.

The PTFE membrane filtration and CHCl₃ washing steps were used to remove free 1a. According to the weight gain, the weight ratio ($WR_{final}$) of 1a:$SWNTs_{HiPco}$ in the final product is estimated to be about 0.38–0.40, which is independent of $WR_{initial}$. For example, the WR data in three 1a:$SWNTs_{HiPco}$ reactions are as follows: 1) $WR_{initial}$=1.00, $WR_{final}$=0.40; 2) $WR_{initial}$=0.40, $WR_{final}$=0.38; 3) $WR_{initial}$=0.40, $WR_{final}$=0.39. Although this estimate is still rough, it strongly suggests that 1 could form stable and irreversibly bound complexes with carbon nanotubes in CHCl₃, instead of a simple mixture.

Figure 5A:
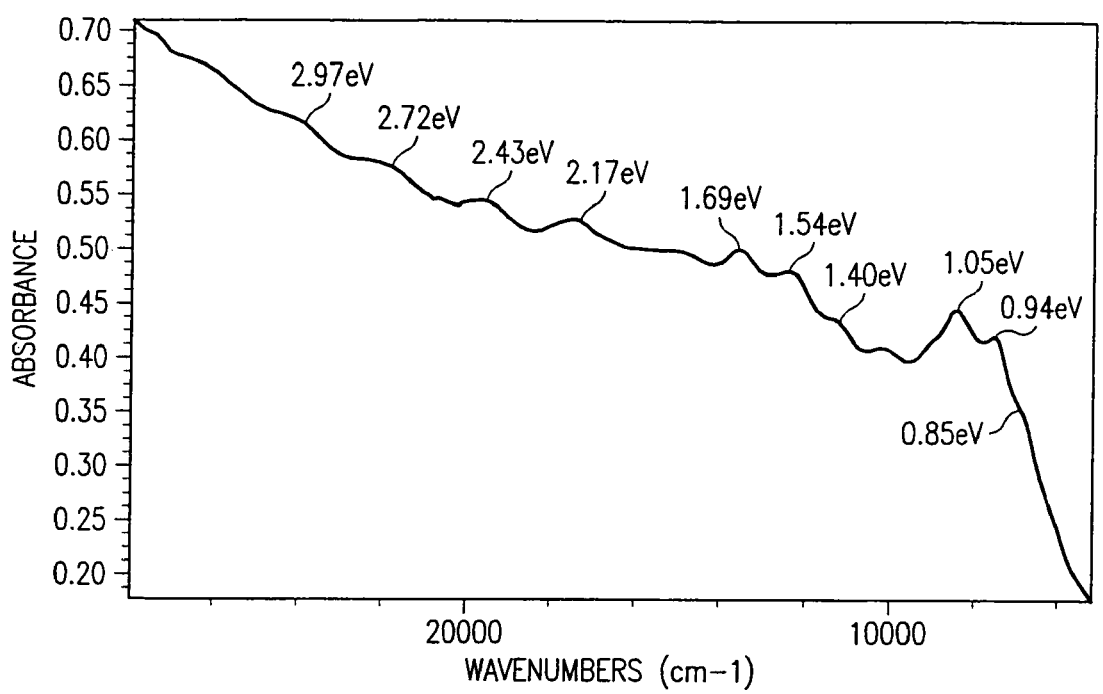
FIG. 5A shows a graph illustrating the thin film visible and near infrared (IR) spectra of $SWNTs_{HiPco}$ (without a polymer associated therewith)
Figure 5B:
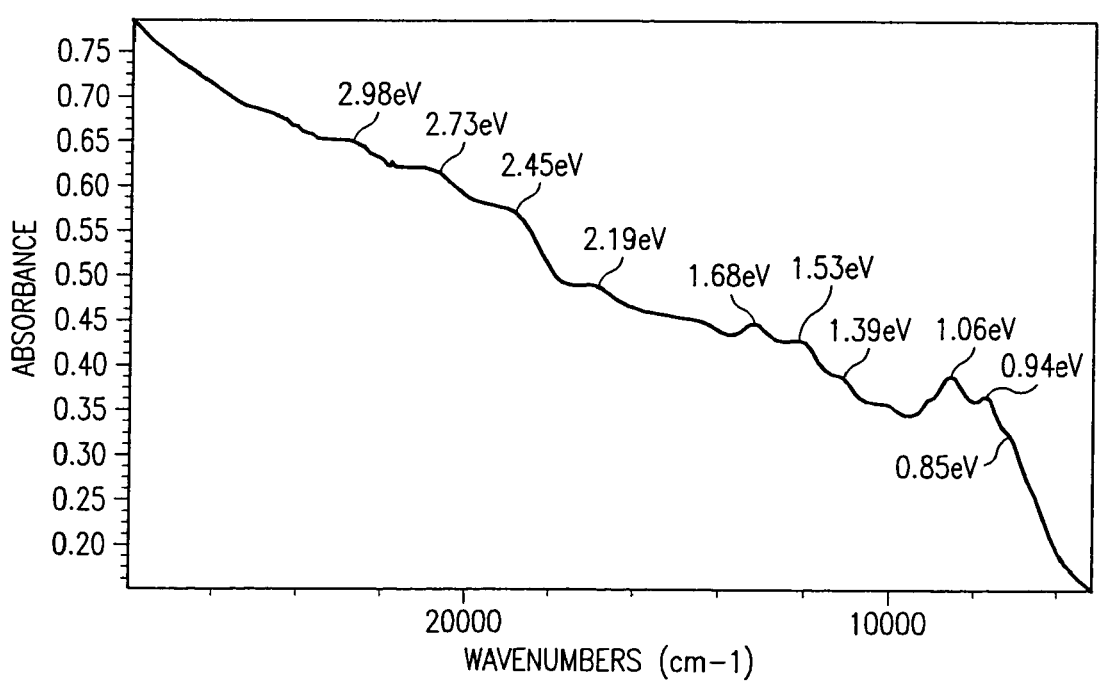
FIG. 5B shows a graph illustrating the thin film visible and near IR spectra of $SWNTs_{HiPco}$ solubilized by an example polymer of an embodiment of the present invention.

A preferred embodiment of the present invention provides a polymer for solubilizing carbon nanotubes while preserving nearly all of the nanotubes' intrinsic properties. For instance, FIG. 5A shows a graph illustrating the thin film visible and near infrared (IR) spectra of $SWNTs_{HiPco}$ (without a polymer associated therewith). FIG. 5B shows a graph illustrating the thin film visible and near IR spectra of 1a-$SWNTs_{HiPco}$. According to the thin film visible and near-IR spectroscopies, the band structures of 1a-$SWNTs_{HiPco}$ (of FIG. 5B) are very similar to those of pristine $SWNTs_{HiPco}$ (of FIG. 5A), indicating that the electronic structures of $SWNTs_{HiPco}$ are basically intact upon polymer complexation. The charge-transfer in 1a-$SWNTs_{HiPco}$ is believed to be insignificant based on both absorption and Raman spectra. It should be noted that in the spectrum of 1a-$SWNTs_{HiPco}$ (of FIG. 5B) there is a very broad signal that is overlapped with those of $SWNTs_{HiPco}$ (of FIG. 5A) between 3.5 and 2 eV, which presumably arises from the lowest energy absorption of 1a in the nanotube complex.

The bucky paper made of 1-$SWNTs_{HiPco}$ complex (Tensile strength=28.3 MPa; Young's modulus=4.5 GPa) demonstrates a significant improvement in mechanical properties compared to those of bucky paper made of pure $SWNTs_{HiPco}$ (Tensile strength=9.74 MPa; Young's modulus=0.26 GPa). Both types of bucky papers were produced by the same room temperature membrane filtration process (without any high temperature annealing) for better comparison. This shows that 1 can increase the adhesion between nanotubes via more efficient π-π interactions. Accordingly, the resulting bucky paper dissolves more slowly in CHCl₃ at a lower concentration (approximately 0.1–0.2 mg/ml of 1a-$SWNTs_{HiPco}$ in CHCl₃). For applications that require high nanotube concentration (for example, polymer composites), using 1-SWNTs (W=0.4) solution in CHCl₃ prepared in situ without filtration is recommended.

Various other soluble functional polymers with π-conjugated backbone structures may also be used to solubilize carbon nanotubes in organic solvents in accordance with alternative embodiments of the present invention. Some of such polymer backbone structures are shown as below (R represents any organic functional group; Ar represents any π-conjugated structure), as structures 5–18:

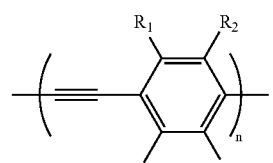

5

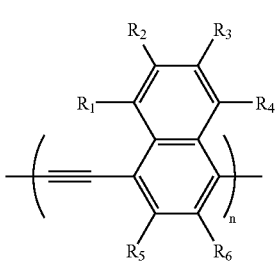

6

-continued
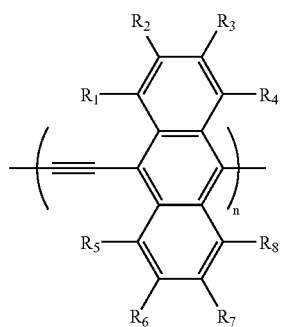
7
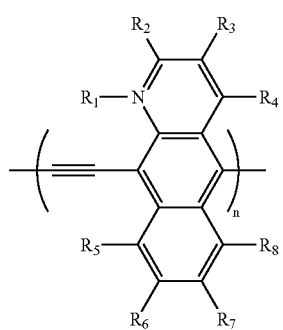
8
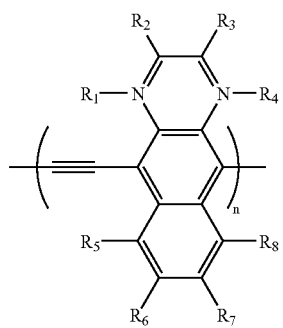
9
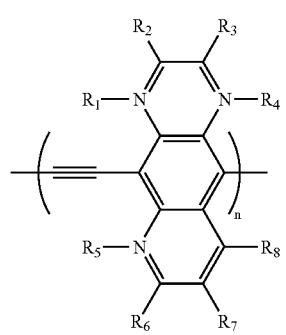
10
-continued
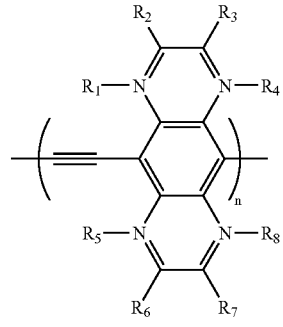
11
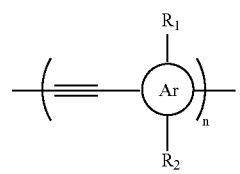
12
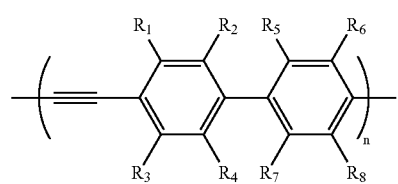
13
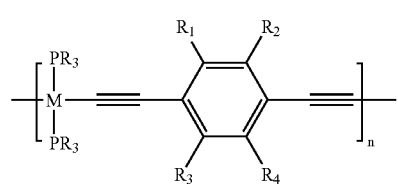
14
M = Ni, Pd, Pt
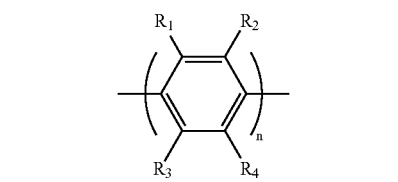
15
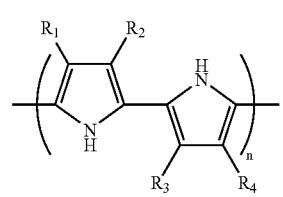
16
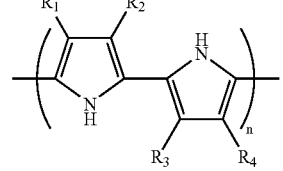
17

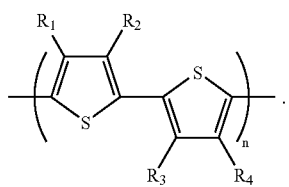

18

In the above backbones 5–18, n is preferably greater than or equal to 2, and R represents any organic functional group, such as R=$OC_{10}H_{21}$, R=$C_{10}H_{21}$, or other functional group described herein for solubilizing nanotubes, as examples. It should be recognized that the example backbones 5–15 are poly (aryleneethynylene)s, backbone 16 is a polyphenylene, backbone 17 is a polypyrrole, and backbone 18 is a polythiophene.

The 1-$SWNTs_{HiPco}$ solution of a preferred embodiment can mix homogeneously with other polymer solutions such as polycarbonate and polystyrene. Homogeneous nanotube-polycarbonate and -polystyrene composites can be prepared by removing the organic solvents.

As an example, 0.6 ml of a chloroform solution (125 mg/ml) of poly(bisphenol A carbonate) was homogeneously mixed with 2.89 ml of a chloroform solution (1.3 mg/ml of $SWNTs_{HiPco}$) of 1a-$SWNTs_{HiPco}$. A homogeneous SWNTs/poly(bisphenol A carbonate) composite (5 wt % of $SWNTs_{HiPco}$) was formed after removing the chloroform solvent. By varying the ratio 1a-$SWNTs_{HiPco}$:poly(bisphenol A carbonate), a series of SWNTs/poly(bisphenol A carbonate) composites with different SWNTs fillings can be easily made.

Soluble 1a-$SWNTs_{HiPco}$ complex significantly improves the mechanical properties of commercial polymers. For example, the tensile strength and break strain of pure poly (bisphenol A carbonate) are 26 MPa and 1.23%, respectively; 3.8 wt % of $SWNTs_{HiPco}$ filling results in 68% and 1800% increases in tensile strength (43.7 MPa) and break strain (19.1%) of poly(bisphenol A carbonate) (average $M_W$ approximately 64,000), respectively.

Figure 6A:
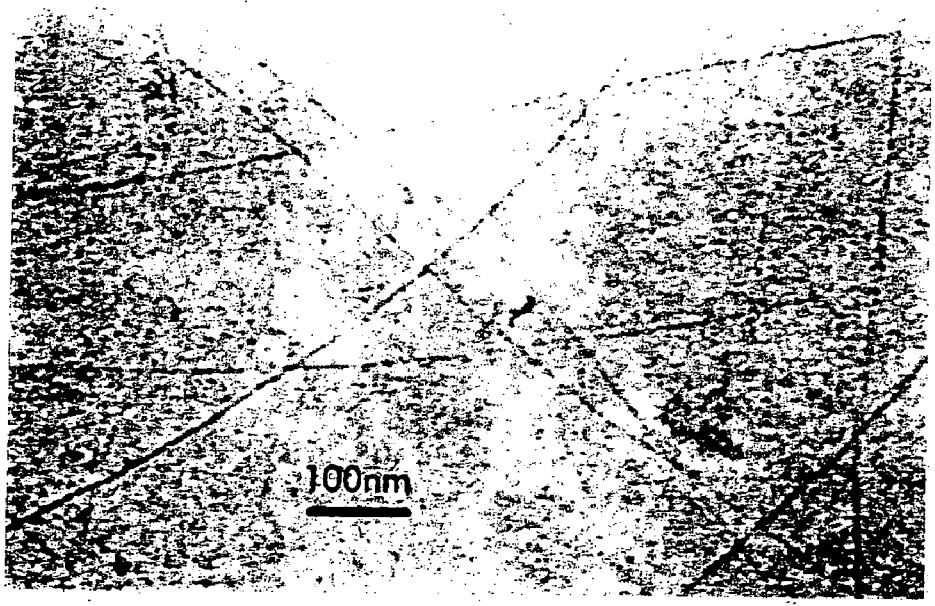
FIG. 6A shows a transmission electron microscopy ("TEM") image of $SWNTs_{laser}$ (i.e., SWNTs produced by the laser technique) solubilized by an example polymer of an embodiment of the present invention.
Figure 6B:
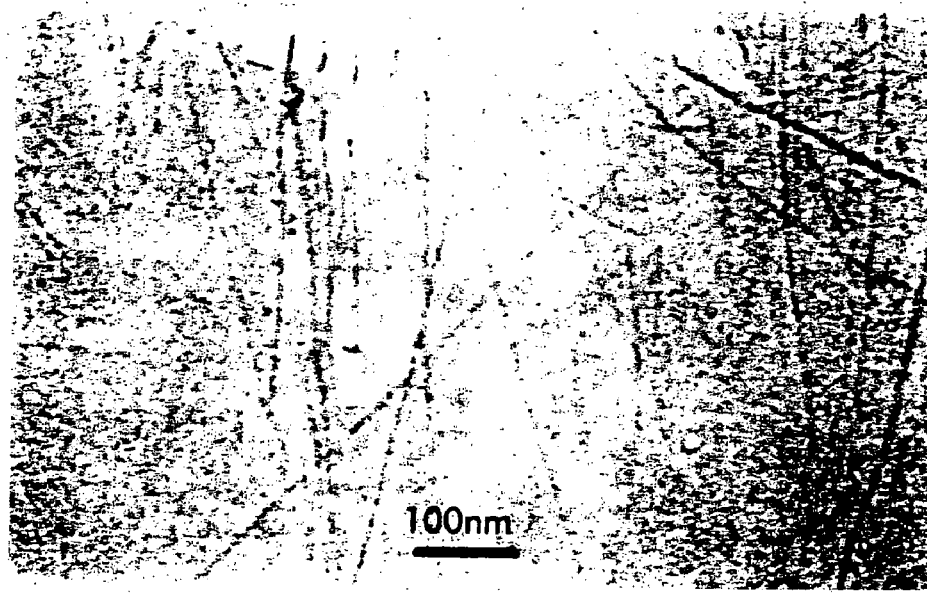
FIG. 6B shows a TEM image of $SWNTs_{arc}$ (i.e., SWNTs produced by the arc technique) solubilized by an example polymer of an embodiment of the present invention.
Figure 6C:
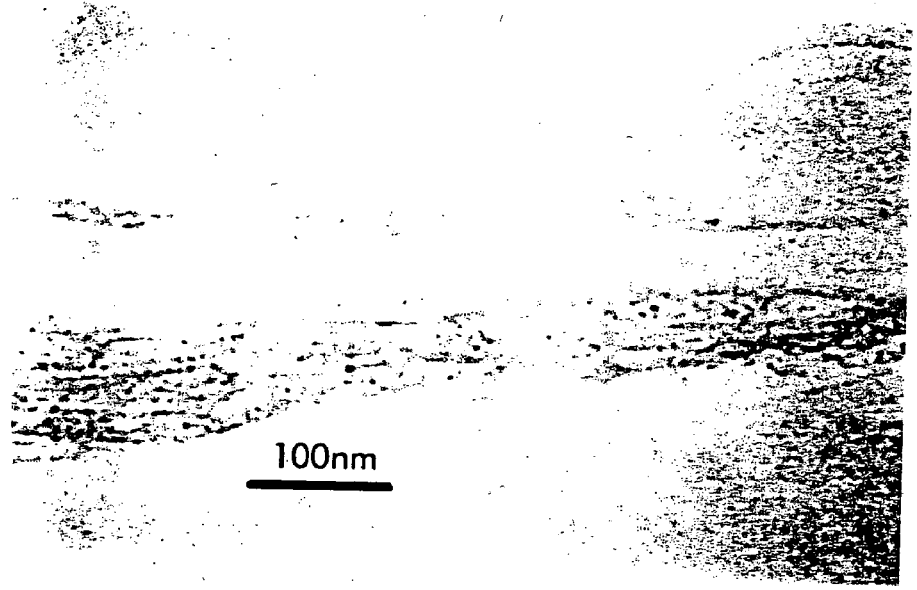
FIGS. 6C and 6D show TEM images of $SWNTs_{HiPco}$ solubilized with an example polymer of an embodiment of the present invention.
Figure 6D:
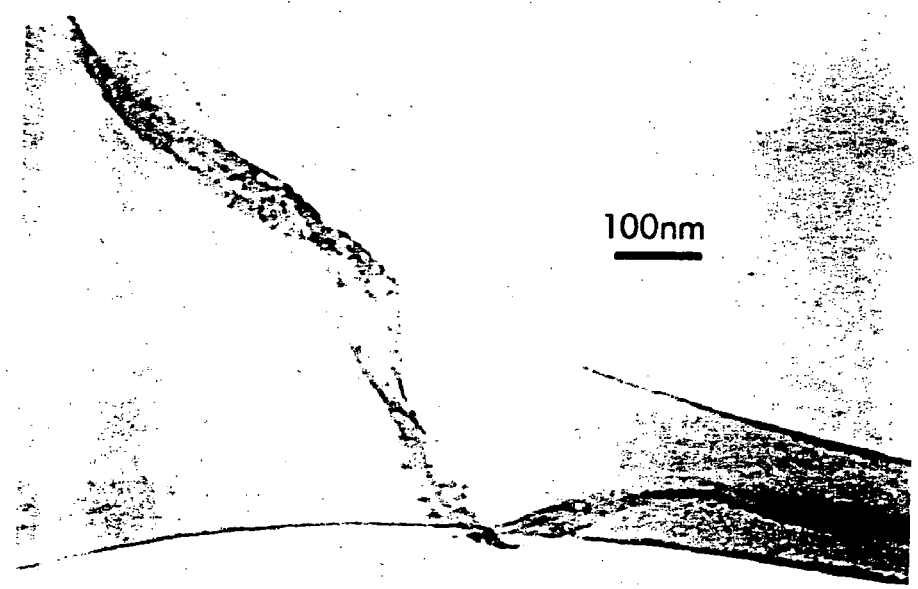
Figure 7A:
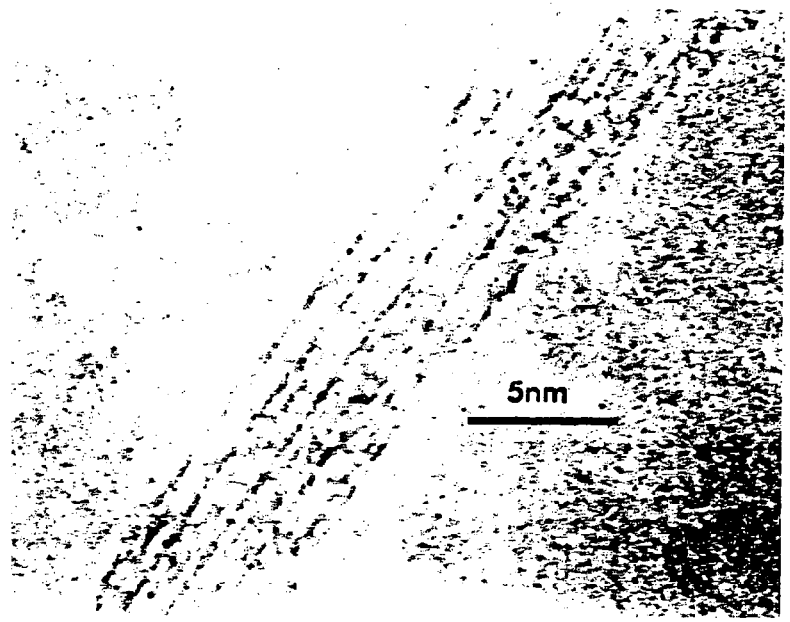
FIGS. 7A and 7B show high resolution TEM images of $SWNTs_{laser}$ solubilized with an example polymer of an embodiment of the present invention.
Figure 7B:
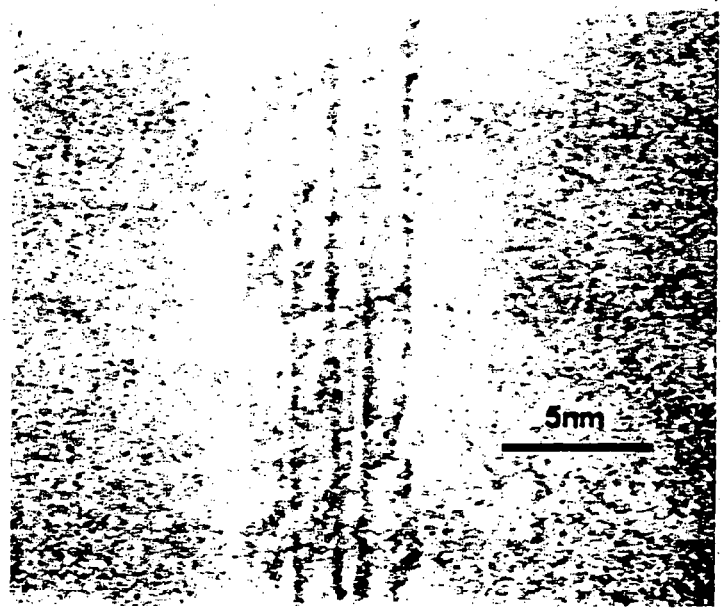
Figure 8A:
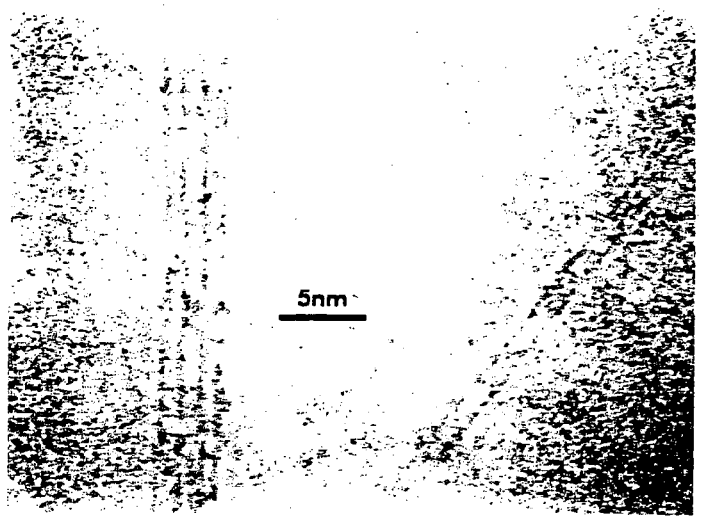
FIGS. 8A–8C show high resolution TEM images of $SWNTs_{arc}$ solubilized with an example polymer of an embodiment of the present invention.
Figure 8B:
Figure 8C:
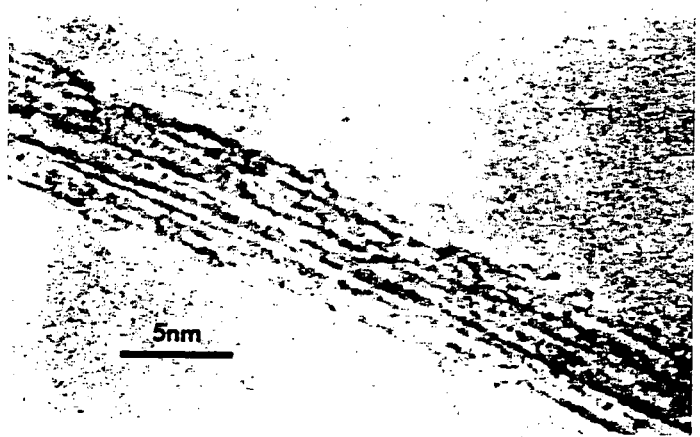
Figure 9:
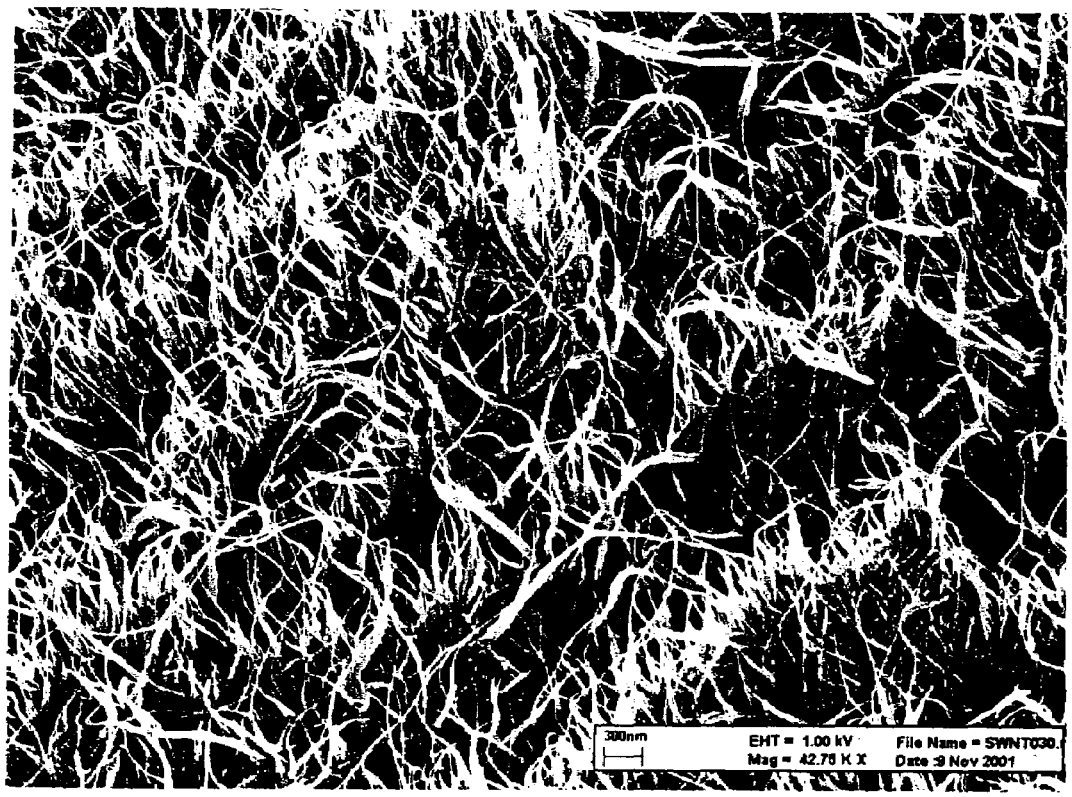
FIG. 9 shows a field-emission scanning electron microscopy ("SEM") image (1.00 kV) of a torn edge of Bucky paper formed in accordance with a solubilization technique of an embodiment of the present invention, which illustrates that the majority of the sample is SWNT nanoribbon.

FIGS. 6A–6D, 7A–7B, and 8A–8C show transmission electron microscopy (TEM) images, and FIG. 9 shows a field emission scanning electron microscopy (SEM) image, which are described further hereafter. More specifically, FIG. 6A shows a TEM image of 1-$SWNTs_{laser}$, FIG. 6B shows a TEM image of 1-$SWNTs_{arc}$, and FIGS. 6C and 6D show TEM images of 1-$SWNTs_{HiPco}$. For reference, the scale bar shown in FIGS. 6A–6D is 100 nm.

FIGS. 7A and 7B show high resolution TEM images of 1a-$SWNTs_{laser}$ (120 kV, one drop of the freshly prepared chlorobenzene solution of 1a-$SWNTs_{laser}$ (approximately 0.05 mg/ml) was placed on a Holey Carbon 400 mesh TEM grid (SPI Supplies, Formvar coating was removed) in contact with a Kimwipes wiper. The solvent was quickly soaked away by the wiper, preventing the aggregation of nanotubes). For reference, the scale bar shown in FIGS. 7A–7B is 5 nm.

FIGS. 8A–8C show high resolution TEM images of 1a-$SWNTs_{arc}$ (120 kV, one drop of the freshly prepared chlorobenzene solution of 1a-$SWNTs_{arc}$ (approximately 0.05 mg/ml) was placed on a Holey Carbon 400 mesh TEM grid (SPI Supplies, Formvar coating was removed) in contact with a Kimwipes wiper. The solvent was quickly soaked away by the wiper, preventing the aggregation of nanotubes). For reference, the scale bar shown in FIGS. 8A–8C is 5 nm.

FIG. 9 shows field-emission SEM image (1.00 kV) of a torn edge of Bucky paper (1a-$SWNTs_{HiPco}$), illustrating that the majority of sample is SWNT nanoribbon. The TEM images show that the majority of SWNTs in 1a-$SWNTs_{laser}$ and 1a-$SWNTs_{arc}$ are small ropes (2–6 nm, see FIGS. 6A, 6B, 7A, 7B, and 8A–8C), whereas the majority of SWNTs in 1a-$SWNTs_{HiPco}$ are nanoribbon assemblies of small ropes (see FIGS. 6C, 6D, and 9). The observation of a twisted SWNT nanoribbon on TEM grid surface shown in FIG. 6D is indicative of the robustness of such two dimensional (2D) assemblies and further supports a π-stacking interaction with the polymer backbone oriented along the nanotube's length. Such nanoribbon is indicative of robustness because if the 2D assembly is not robust, it will easily collapse into small ropes on the TEM grid surface. It should be possible to prevent such 2D assembly and obtain small ropes and/or individual $SWNTs_{HiPco}$ by using 1, for example, with bulky and/or ionic functional groups in the end of the side chains.

The bucky paper made of 1-$SWNTs_{HiPco}$ complex (Tensile strength=28.3 MPa; Young's modulus=4.5 GPa) demonstrates quantitatively a significant improvement in mechanical properties compared to those of bucky paper of pure $SWNTs_{HiPco}$ (Tensile strength=9.74 MPa; Young's modulus=0.26 GPa). Both types of bucky papers were produced by the same room temperature membrane filtration process (without any high temperature annealing) for better comparison.

In view of the above, it should be recognized that embodiments of the present invention provide a molecular structure that is capable of noncovalently bonding with a nanotube (e.g., carbon nanotube) in a non-wrapping manner, and the molecular structure may comprise one or more functional groups for solubilizing the nanotube to which the molecular structure associates. Preferably, the molecular structure forms a non-covalent bond with the nanotube; however, in certain implementations the molecular structure may be such that it forms a covalent bond with the nanotube in a non-wrapping fashion.

Solubilization of nanotubes allows for their use in enhancing the properties of various compositions of matter, including, as one example, plastics. Insoluble nanotubes cannot be dispersed homogeneously in commercial plastics and adhesives; therefore the polymer composites made by the addition of insoluble nanotubes gave little improvement in mechanical performance of plastics (Ajayan, P. M. et al., Adv. Mater. 2000, 12, 750; Schadler, L. S. et al. Appl. Phys. Lett. 1998, 73, 3842). In contrast, soluble nanotubes can significantly improve the mechanical performance of plastics, for example. For example, the tensile strength and break strain of pure poly(bisphenol A carbonate) are 26 MPa and 1.23%, respectively; 3.8 wt % of $SWNTs_{HiPco}$ filling results in 68% and 1800% increases in tensile strength (43.7 MPa) and break strain (19.1%) of poly(bisphenol A carbonate) (average $M_W$ approximately 64,000), respectively.

While various examples above are described for solubilizing carbon nanotubes, and more particularly single-walled carbon nanotubes, embodiments of the present invention are not intended to be limited solely in application to carbon nanotubes. Nanotubes may be formed from various materials such as, for example, carbon, boron nitride, and composites thereof. The nanotubes may be single-walled nanotubes or multi-walled nanotubes. Thus, while examples are described herein above for solubilizing carbon nanotubes, certain embodiments of the present invention may be utilized for solubilizing various other types of nanotubes, including without limitation multi-walled carbon nanotubes (MWNTs), boron nitride nanotubes, and composites thereof. Accordingly, as used herein, the term "nanotubes" is not limited solely to carbon nanotubes. Rather, the term "nanotubes" is used broadly herein and, unless otherwise qualified, is intended to encompass any type of nanotube now known or later developed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of solubilizing a nanotube, said method comprising:
    noncovalently bonding a polymer comprising at least one functional group with a nanotube in a non-wrapping fashion.

2. The method of claim 1 further comprising mixing said polymer and said nanotube in a solvent under conditions whereby said polymer noncovalently bonds with said nanotube in said non-wrapping fashion.

3. The method of claim 2 wherein said solvent comprises an organic solvent.

4. The method of claim 2 wherein said solvent comprises an aqueous solvent.

5. The method of claim 1 wherein said polymer comprises a backbone portion that noncovalently bonds with said nanotube in a non-wrapping fashion via π-stacking.

6. The method of claim 1 wherein said nanotube is a carbon nanotube.

7. The method of claim 1 wherein said polymer comprises a poly(aryleneethynylene).

8. The method of claim 1 wherein said polymer comprises a poly(phenyleneethynylene).

9. The method of claim 1 wherein said polymer comprises poly(3-decylthiophene).

10. A product resulting from the process of claim 1.

11. A composition of matter comprising at least one nanotube solubilized by the process of claim 1.

12. A polymer for solubilizing nanotubes, said polymer comprising:
    a backbone portion for noncovalently bonding with a nanotube in a non-wrapping fashion; and
    at least one functional portion for solubilizing said nanotube.

13. The polymer of claim 12 wherein said backbone portion comprises a portion selected from the group consisting of:

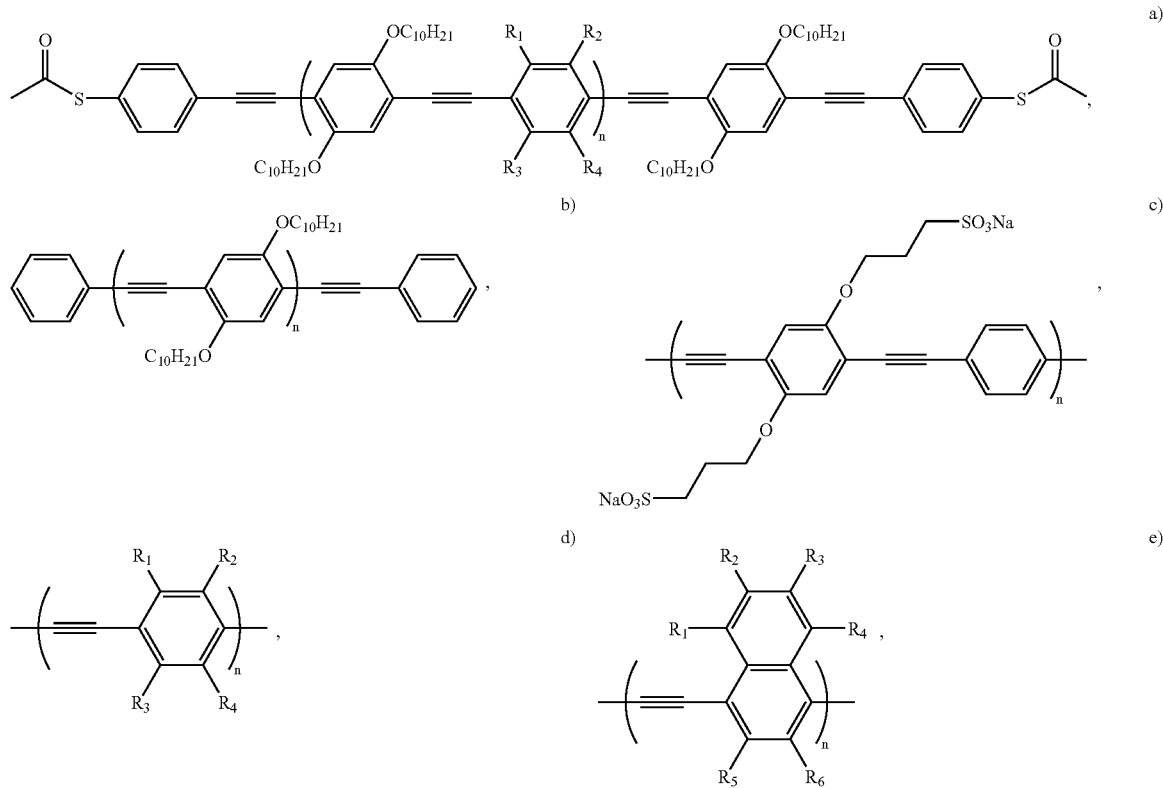

-continued
f)
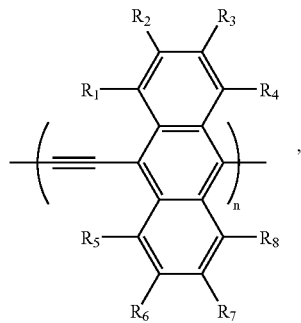
g)
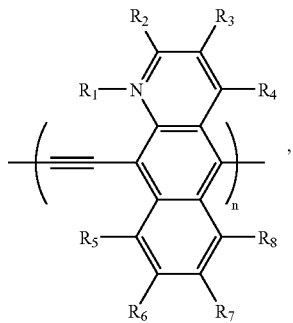
h)
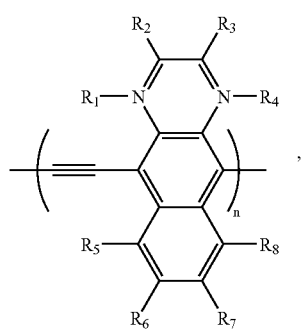
i)
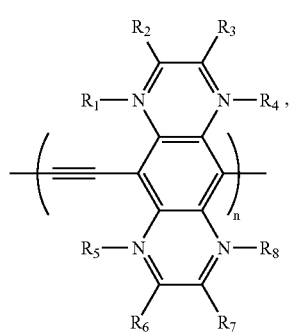
j)
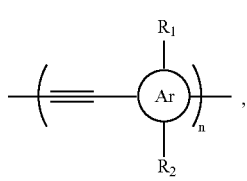
k)
l)
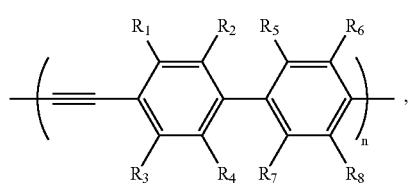
m)
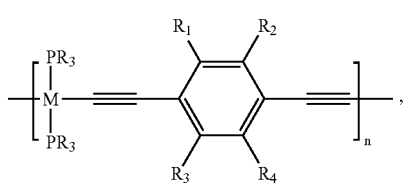
wherein M is selected from the group consisting of Ni, Pd, and Pt,
-continued
n)
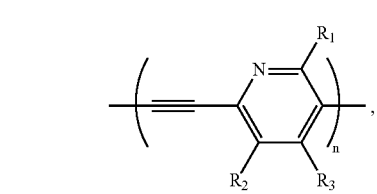
o)
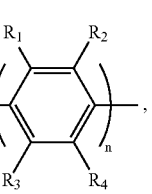

-continued

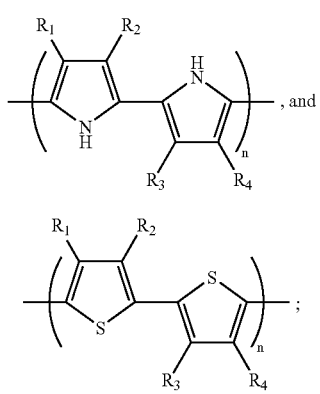

wherein each of R4–R8 in the above-listed backbone portions a)-q) represents a functional group.

14. The polymer of claim 12 comprising poly(arylene-ethynylene).

15. The polymer of claim 14 comprising at least 4 of said functional portions (R1, R2, R3, and R4), wherein said functional portions comprise functional portions selected from the group consisting of:

a) $R_1=R_4=H$ and $R_2=R_3=OC_{10}H_{21}$, b) $R_1=R_2=R_3=R_4=F$, c) $R_1=R_4=H$ and $R_2=R_3=$

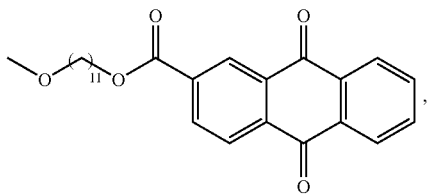

and d) $R_1=R_4=H$ and $R_2=R_3=$

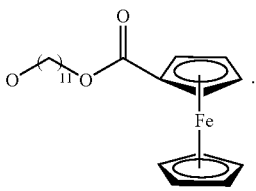

16. The polymer of claim 12 comprising poly(phenyleneethynylene).

17. The polymer of claim 12 comprising poly(3-decylthiophene).

18. The polymer of claim 12 wherein said nanotube is a carbon nanotube.

19. The polymer of claim 12 wherein said backbone portion is capable of interacting with said nanotube's surface via π-stacking.

20. The polymer of claim 12 wherein said at least one functional portion comprises at least one selected from the group consisting of:

H, $OC_{10}H_{21}$, F,

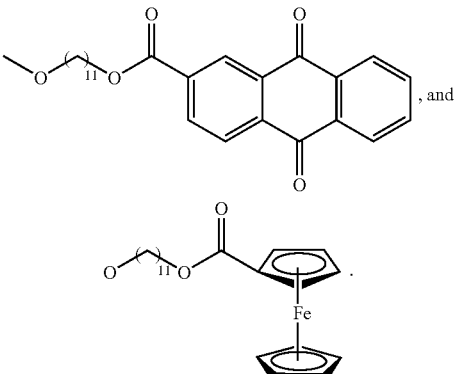

21. A process comprising:
mixing at least one polymer with at least one nanotube in a solvent; and
said mixing results in said at least one polymer forming a noncovalent bond with said at least one nanotube in a non-wrapping fashion and said at least one polymer solubilizing said at least one nanotube.

22. A product resulting from the process of claim 21.

23. A composition of matter comprising at least one nanotube solubilized by the process of claim 21.

24. The process of claim 21 wherein said at least one nanotube is a carbon nanotube.

25. The process of claim 21 wherein said at least one polymer comprises a backbone portion for forming said noncovalent bond with said at least one nanotube.

26. The process of claim 21 wherein said backbone interacts with said at least one nanotube's surface via π-stacking.

27. The process of claim 21 wherein said solvent comprises one selected from the group consisting of:
chloroform, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, and 1,4-dichlorobenzene.

28. A method of solubilizing carbon nanotubes, said method comprising:
interacting at least one polymer comprising at least one functional group with at least one carbon nanotube in a solvent, wherein said polymer interacts with said at least one carbon nanotube's surface in a non-wrapping fashion via π-stacking; and said at least one polymer solubilizing said at least one carbon nanotube.

29. The method of claim 28 wherein said at least one polymer noncovalently bonds with said at least one carbon nanotube in a non-wrapping fashion.

30. The method of claim 28 wherein said at least one polymer comprises a poly(aryleneethynylene).

31. The method of claim 28 wherein said at least one polymer comprises a poly(phenyleneethynylene).

32. The method of claim 28 wherein said at least one polymer comprises poly(3-decylthiophene).

33. A product resulting from the process of claim 28.

34. A composition of matter comprising at least one carbon nanotube solubilized by the process of claim 28.

35. A composite, comprising:

polycarbonate or polystyrene; and functionalized, solubilized nanotubes mixed within the polycarbonate or polystyrene, wherein the functionalized, solubilized nanotubes comprise a backbone polymer structure bonded to the nanotubes in a nonwrapping fashion, the backbone comprising a portion selected from the group consisting of:

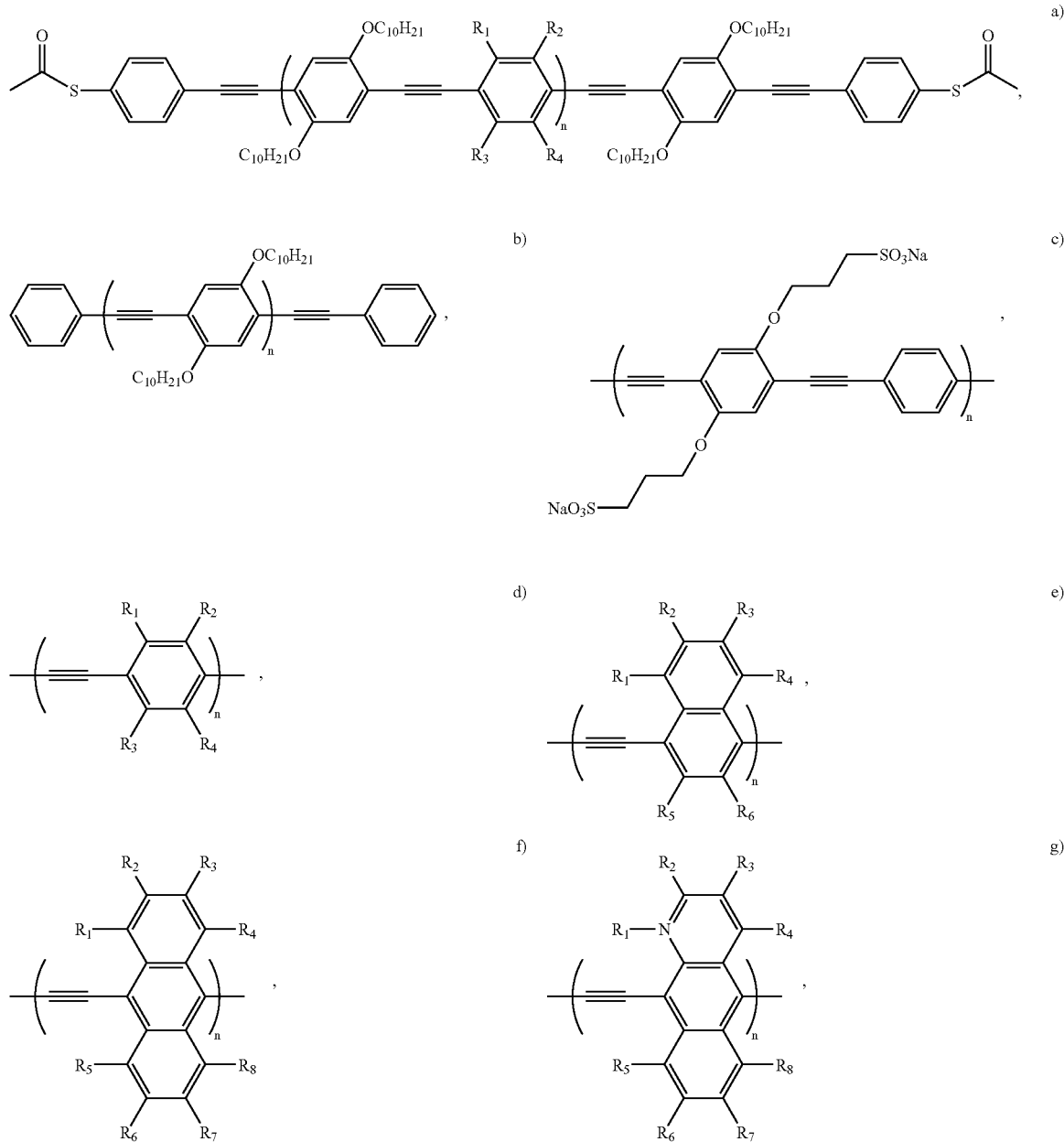

-continued

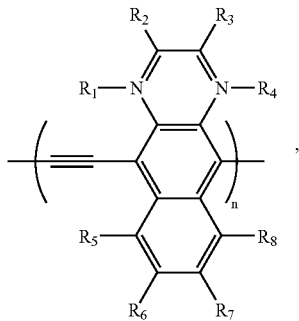
h)

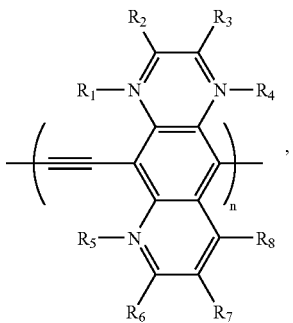
i)

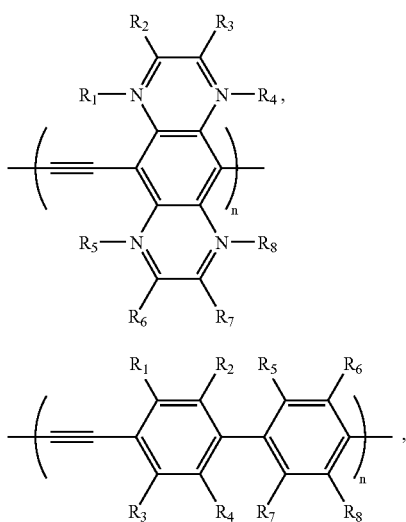
j)

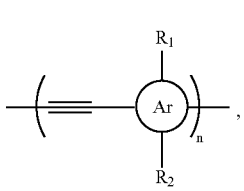
k)

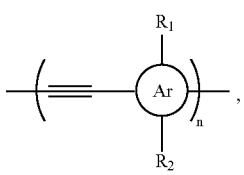

l)

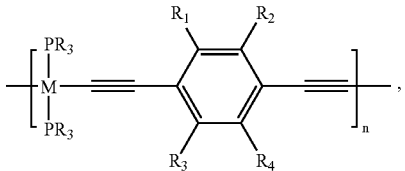
m)

wherein M is selected from the group consisting of Ni, Pd, and Pt,

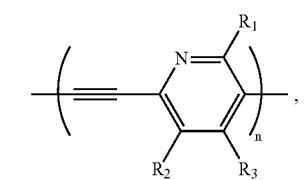
n)

-continued

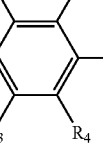
q)

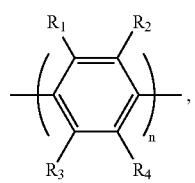
o)

wherein each of $R_1$–$R_8$ in the above-listed backbone portions a)-q) represents a functional group.

36. The composite of claim 35 wherein the backbone comprises a poly(aryleneethynylene).

37. The composite of claim 36 wherein the poly(aryleneethynylene) comprises at least 4 of said functional portions ($R_1$, $R_2$, $R_3$, and $R_4$), wherein said functional portions comprise functional portions selected from the group consisting of:

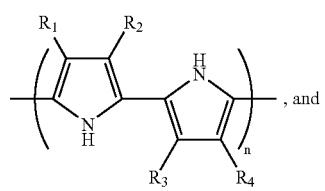, and a) $R_1=R_4=H$ and $R_2=R_3=OC_{10}H_{21}$,
b) $R_1=R_2=R_3=R_4=F$,
c) $R_1=R_4=H$ and $R_2=R_3=$

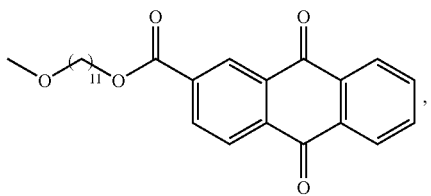

and d) $R_1=R_4=H$ and $R_2=R_3=$

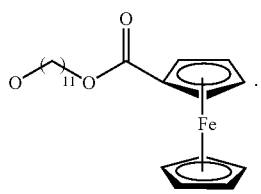

38. The composite of claim 35 wherein the backbone comprises a poly(phenyleneethynylene).

39. The composite of claim 35 wherein the backbone comprises a poly(3-decylthiophene).

40. The composite of claim 35 wherein said nanotube is a carbon nanotube.

41. The composite of claim 35 wherein the nanotube comprises a single-walled carbon nanotube, a multi-walled carbon nanotube, or a combination thereof.

42. The composite of claim 35 comprising polycarbonate.

43. The composite of claim 35 comprising polystyrene.

44. The composite of claim 35 wherein said at least one functional portion comprises at least one selected from the group consisting of:

H, $OC_{10}H_{21}$, F,

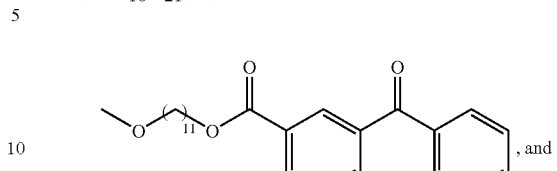, and

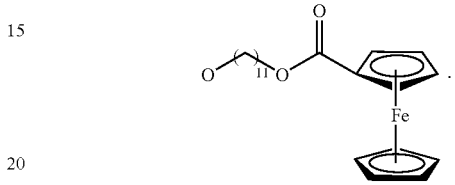

45. An article of manufacture comprising the composite of claim 35.

46. The article of manufacture of claim 45 wherein the article of manufacture comprises a plastic.

47. A process comprising:

mixing functionalized, solubilized nanotubes and poly(bisphenol A carbonate) in an organic solvent to form a nanocomposite, wherein the functionalized, solubilized nanotubes comprise a backbone bonded to the nanotubes in a non-wrapping fashion, the backbone comprising a portion selected from the group consisting of:

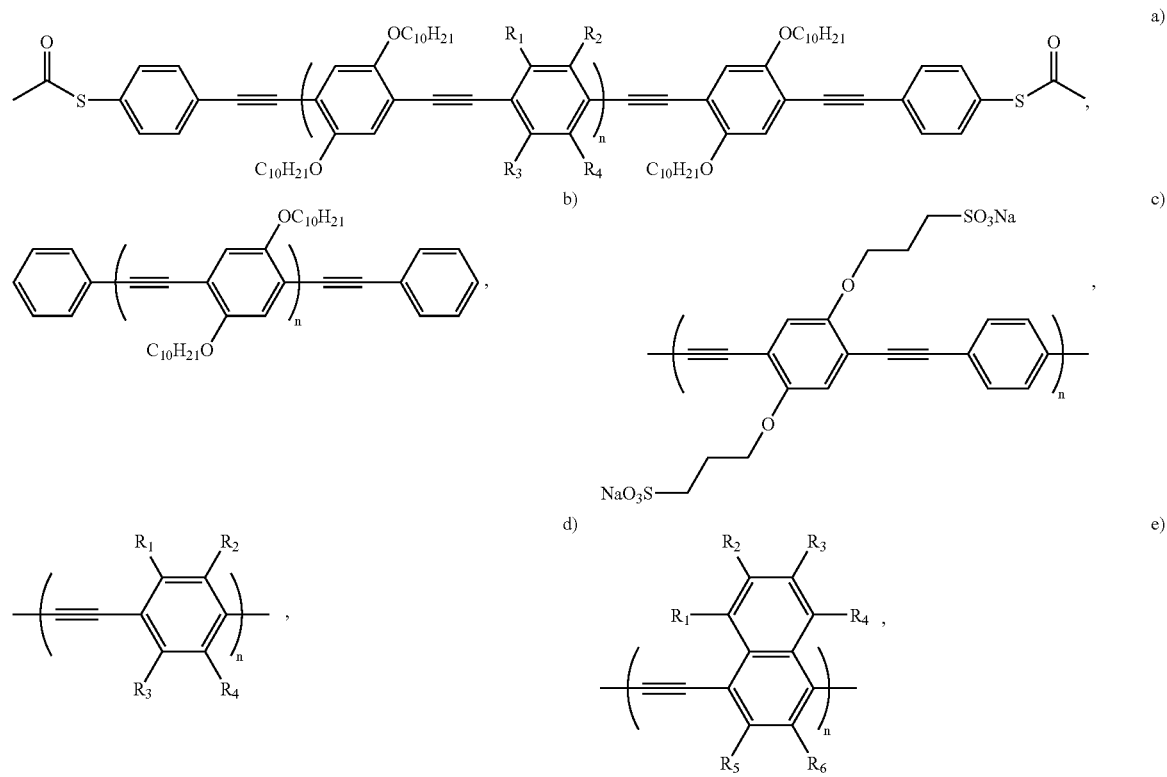

-continued
f) 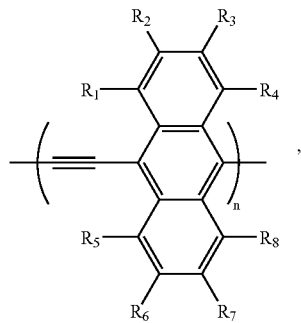
g) 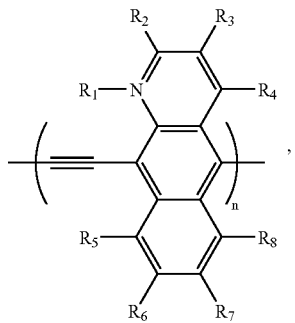
h) 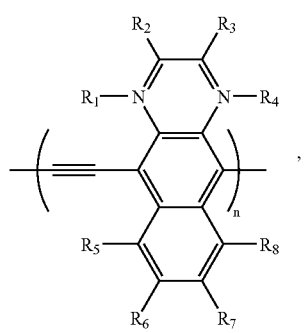
i) 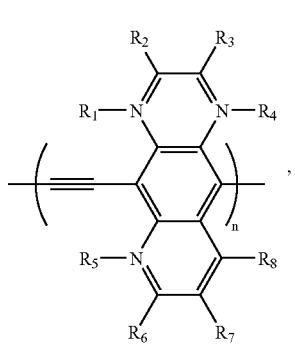
j) 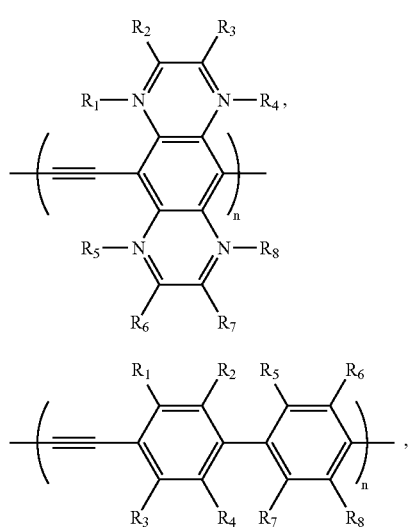
k) 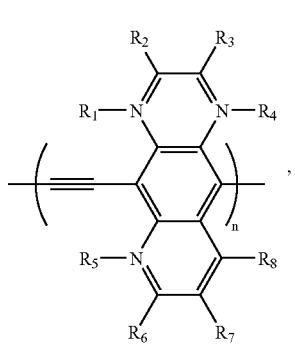
l) 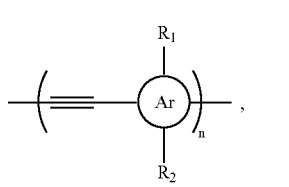
m) 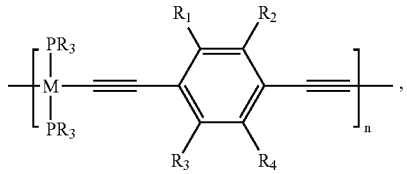
wherein M is selected from the group consisting of Ni, Pd, and Pt,
n) 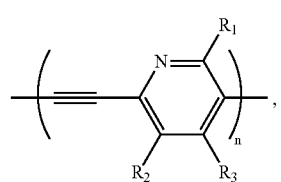
o) 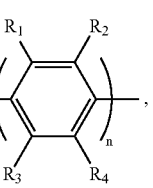

-continued

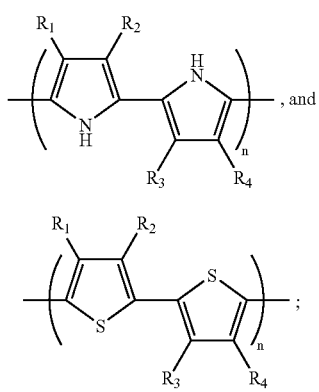

p)

, and

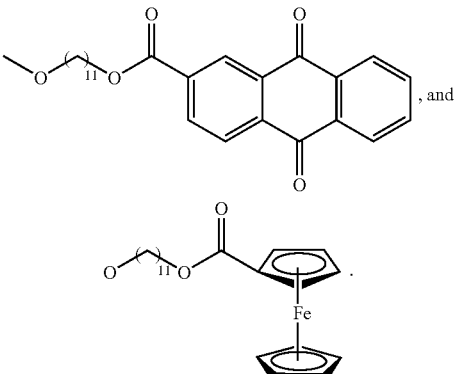

q)

H, OC$_{10}$H$_{21}$, F,

, and wherein each of R$_4$–R$_8$ in the above-listed backbone portions a)-q) represents a functional group.

48. The process of claim 47 wherein the backbone comprises a poly(aryleneethynylene).

49. The process of claim 48 wherein the poly(aryleneethynylene) comprises at least 4 of said functional portions (R$_1$, R$_2$, R$_3$,) and R$_4$, wherein said functional portions comprise functional portions selected from the group consisting of:

a) R$_1$=R$_4$=H and R$_2$=R$_3$=OC$_{10}$H$_{21}$,
b) R$_1$=R$_2$=R$_3$=R$_4$=F,
c) R$_1$=R$_4$=H and R$_2$=R$_3$=

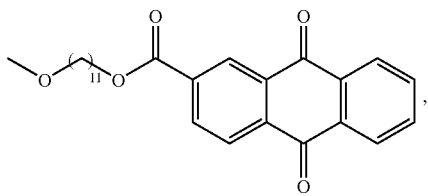

and d) R$_1$=R$_4$=H and R$_2$=R$_3$=

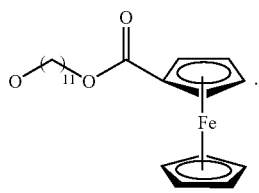

50. The process of claim 47 wherein the backbone comprises a poly(phenyleneethynylene).

51. The process of claim 47 wherein the backbone comprises a poly(3-decylthiophene).

52. The process of claim 47 wherein said nanotube is a carbon nanotube.

53. The process of claim 47 wherein the nanotube comprises a single-walled carbon nanotube, a multi-walled carbon nanotube, or a combination thereof.

54. The process of claim 47 wherein said at least one functional portion comprises at least one selected from the group consisting of:

55. A product produced by the process of claim 47.

56. The process of claim 47 further comprising removing the organic solvent.

57. A method of producing a material comprising:
mixing a polymer with nanotubes in a solvent to produce polymer-solubilized nanotubes, wherein the polymer noncovalently associates with the nanotubes in a non-wrapping fashion, and the polymer comprises a backbone portion selected from the group consisting of a poly(aryleneethynylene), a poly(phenyleneethynylene), a poly(3-decylthiophene) and a polypyrrole, and at least one functional group; and
drying the polymer-solubilized nanotubes under conditions to produce the material.

58. The method of claim 57 further comprising collecting the polymer-solubilized nanotubes by membrane filtration.

59. The method of claim 58 further comprising washing the collected polymer-solubilized nanotubes with the solvent.

60. The method of claim 57 wherein the drying is at about or above room temperature.

61. The method of claim 57 wherein the drying is under vacuum.

62. The method of claim 57 further comprising dissolving the material in a solvent.

63. The method of claim 62 wherein the solvent comprises an organic solvent.

64. The method of claim 62 wherein the solvent comprises an aqueous solvent.

65. The method of claim 62 wherein the solvent comprises chloroform.

66. The method of claim 62 wherein the solvent comprises chloroform, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, or 1,4-dichlorobenzene.

67. A product made by the method of claim 62.
68. A product made by the method of claim 65.
69. A product made by the method of claim 66.
70. A product, comprising:
polymer-solubilized nanotubes in the form of a dried film, wherein the polymer comprises a backbone portion selected from the group consisting of a poly(arylene-ethynylene), a poly(phenyleneethynylene), a poly(3-decylthiophene) and a polypyrrole and at least one functional group, and wherein the polymer is noncovalently bonded with the nanotubes in a non-wrapping fashion.

71. The product of claim 70 wherein the polymer comprises a poly(phenyleneethynylene) and the nanotubes comprise carbon nanotubes.

72. The product of claim 70 wherein the backbone portion comprises a portion selected from the group consisting of:

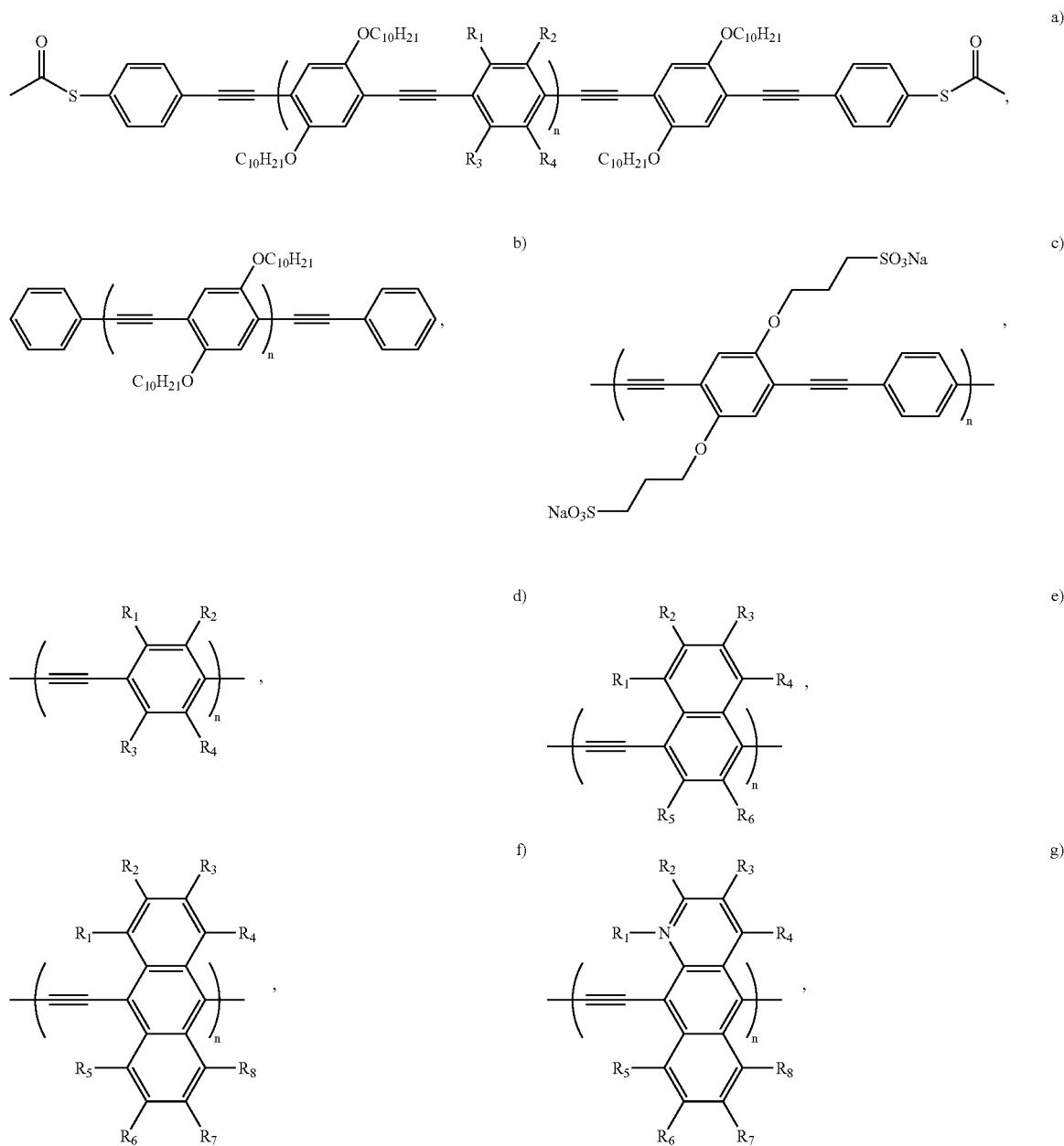

h) 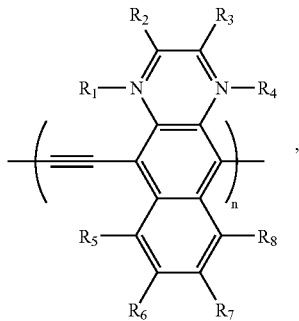
i) 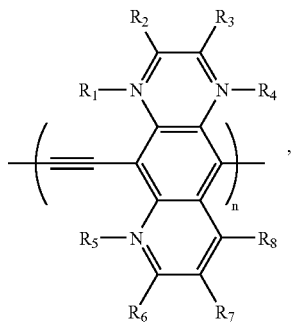
j) 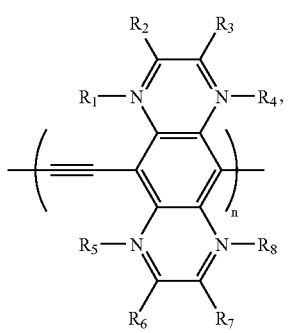
k) 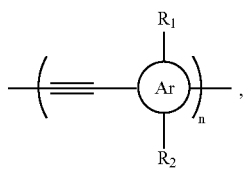
l) 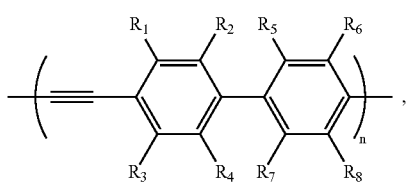
m) 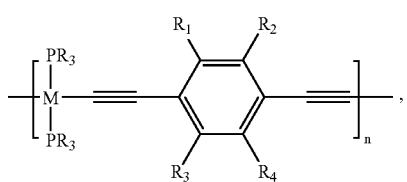
wherein M is selected from the group of Ni, Pd, and Pt,
n) 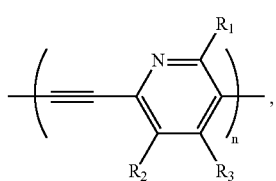
q) 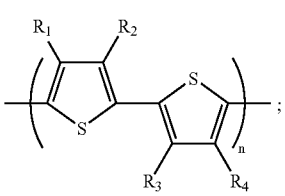
o) 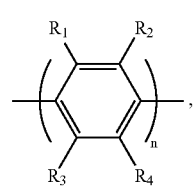
p) 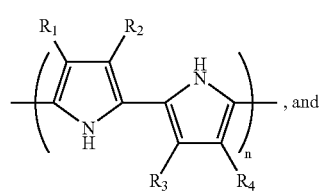, and
wherein
n is greater than or equal to 2; and
at least one of $R_1-R_8$ in the above-listed backbone portions a)-q) represents a functional group.
73. The product of claim 72, wherein $R_1$, $R_2$, $R_3$, and $R_4$ are selected from the group consisting of:
a) $R_1=R_4=H$ and $R_2=R_3=OC_{10}H_{21}$,
b) $R_1=R_2=R_3=R_4=F$,
c) $R_1=R_4=H$ and $R_2=R_3=$

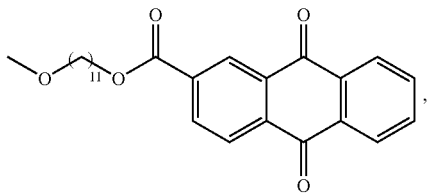

and d) $R_1=R_4=H$ and $R_2=R_3=$

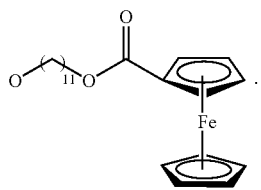

74. A solution comprising a film of polymer-solubilized nanotubes re-dissolved in a solvent,
  wherein the polymer comprises a backbone portion selected from the group consisting of a poly(aryleneethynylene), a poly(phenyleneethynylene), a poly(3-decylthiophene) and a polypyrrole and at least one functional group, and
  wherein the polymer is noncovalently bonded with the nanotubes in a non-wrapping fashion.

75. The solution of claim 74 wherein the solvent comprises an organic solvent.

76. The solution of claim 74 wherein the solvent comprises an aqueous solvent.

77. The solution of claim 74 wherein the solvent comprises chloroform.

78. The solution of claim 74 wherein the solvent comprises chloroform, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, or 1,4-dichlorobenzene.

* * * * *